(12) United States Patent
Naito

(10) Patent No.: US 10,532,312 B2
(45) Date of Patent: Jan. 14, 2020

(54) EXHAUST GAS PROCESSING SYSTEM AND PROCESSING METHOD

(71) Applicant: IHI Corporation, Koto-ku (JP)

(72) Inventor: Toshiyuki Naito, Tokyo (JP)

(73) Assignee: IHI Corporation, Koto-ku (JP)

( * ) Notice: Subject to any disclaimer, the term of this patent is extended or adjusted under 35 U.S.C. 154(b) by 244 days.

(21) Appl. No.: 14/936,819

(22) Filed: Nov. 10, 2015

(65) Prior Publication Data
US 2016/0059185 A1    Mar. 3, 2016

Related U.S. Application Data

(63) Continuation of application No. PCT/JP2014/073815, filed on Sep. 9, 2014.

(30) Foreign Application Priority Data

Sep. 17, 2013   (JP) .................................. 2013-191408

(51) Int. Cl.
*B01D 53/50*    (2006.01)
*B01D 53/56*    (2006.01)
(Continued)

(52) U.S. Cl.
CPC ........... *B01D 53/501* (2013.01); *B01D 47/06* (2013.01); *B01D 53/261* (2013.01);
(Continued)

(58) Field of Classification Search
CPC ...... B01D 53/501; B01D 53/62; B01D 53/64; B01D 53/346; B01D 53/30; B01D 53/261; B01D 53/56; B01D 47/06
See application file for complete search history.

(56) References Cited

U.S. PATENT DOCUMENTS 4,683,211 A * 7/1987 Onizuka .............. B01D 53/501
                                                                    436/133
4,690,807 A * 9/1987 Saleem ................... C01C 1/245
                                                                    423/243.03
(Continued)

FOREIGN PATENT DOCUMENTS

CA      2 916 176 A1     3/2015
CN      101422691 A      5/2009
(Continued)

OTHER PUBLICATIONS

Machine Translation of JP2012-106163 (Year: 2012).*
(Continued)

*Primary Examiner* — Matthew D Krcha
(74) *Attorney, Agent, or Firm* — Oblon, McClelland, Maier & Neustadt, L.L.P.

(57) ABSTRACT

An exhaust gas processing system having excellent durability and good desulfurization and denitration efficiency is provided to efficiently recover carbon dioxide with high purity and reduced processing costs. The exhaust gas processing system has: a desulfurization unit removing sulfur oxides from the exhaust gas by the limestone-gypsum method; a denitration unit arranged downstream of the desulfurization unit to remove nitrogen oxides from the exhaust gas; a carbon dioxide recovery arranged downstream of the denitration unit to recover carbon dioxide from the exhaust gas; and an oxygen supply unit supplying to the desulfurization unit with a faction of the recovered gas from the carbon dioxide recovery unit as oxygen source. An analyzer is used to monitor the purity and recovery ratio of the carbon dioxide recovered, and the supplied ratio of recovered gas is adjusted, based on the monitored purity and recovery ratio.

9 Claims, 3 Drawing Sheets

(51) Int. Cl.
  *B01D 53/26*   (2006.01)
  *B01D 47/06*   (2006.01)
  *B01D 53/34*   (2006.01)
  *B01D 53/62*   (2006.01)
  *B01D 53/64*   (2006.01)

(52) U.S. Cl.
  CPC .......... *B01D 53/346* (2013.01); *B01D 53/56* (2013.01); *B01D 53/62* (2013.01); *B01D 53/64* (2013.01); *B01D 2257/602* (2013.01)

(56) References Cited

U.S. PATENT DOCUMENTS

| | | | | |
|---|---|---|---|---|
| 5,648,053 | A * | 7/1997 | Mimura | B01D 53/1406 423/210 |
| 6,136,283 | A * | 10/2000 | Stern | B01D 53/8628 423/235 |
| 6,521,021 | B1 * | 2/2003 | Pennline | B01D 53/10 110/203 |
| 2003/0047071 | A1 * | 3/2003 | Dolan | B01D 53/047 95/96 |
| 2004/0093796 | A1 * | 5/2004 | Iijima | B01D 53/1475 48/198.3 |
| 2004/0216609 | A1 * | 11/2004 | Baksh | B01D 53/0462 95/8 |
| 2007/0122328 | A1 | 5/2007 | Allam et al. | |
| 2008/0159937 | A1 | 7/2008 | Ouimet | |
| 2008/0196584 | A1 * | 8/2008 | Ha | F25J 3/0266 95/87 |
| 2008/0226515 | A1 | 9/2008 | Allam et al. | |
| 2009/0151318 | A1 | 6/2009 | Handagama et al. | |

FOREIGN PATENT DOCUMENTS

| | | |
|---|---|---|
| CN | 101657247 A | 2/2010 |
| CN | 101396246 A | 11/2010 |
| CN | 102343201 A | 2/2012 |
| JP | 2000-325744 A | 11/2000 |
| JP | 2007-145709 | 6/2007 |
| JP | 3925244 | 6/2007 |
| JP | 2009-97507 | 5/2009 |
| JP | 2012-50931 | 3/2012 |
| JP | 2012-106163 | 6/2012 |
| JP | 2012-143699 | 8/2012 |
| JP | 2013-158735 | 8/2013 |
| JP | 2014-213298 | 11/2014 |
| WO | WO 2010/021053 A1 | 2/2010 |
| WO | WO 2012/107953 A1 | 8/2012 |
| WO | 2013053235 A1 | 4/2013 |

OTHER PUBLICATIONS

Office Action dated Sep. 26, 2017 in Canadian Office Action No. 2,971,059.
Office Action dated Jul. 26. 2016 in Japanese Patent Application No. 2015-537870.
Combined Chinese Office Action and Search Report dated Aug. 22, 2016 in Patent Application No. 201480029173.4 (with English translation of categories of cited documents).
International Search Report dated Dec. 16, 2014 in PCT/JP2014/073815, filed on Sep. 9, 2014 ( with English Translation).
Written Opinion dated Dec. 16, 2014 in PCT/JP2014/073815, filed on Sep. 9, 2014.

* cited by examiner

EXHAUST GAS PROCESSING SYSTEM AND PROCESSING METHOD

CROSS REFERENCE TO RELATED APPLICATIONS

This application is a continuation application of International Application No. PCT/JP2014/073815, filed on Sep. 9, 2014, which claims priority of Japanese Patent Application No. 2013-191408, filed on Sep. 17, 2013, the entire contents of which are incorporated by references herein.

BACKGROUND

Technical Field

Embodiments described herein relates to an exhaust gas processing system and a processing method for removing a sulfur oxide, a nitrogen oxide and the like from an exhaust gas containing carbon dioxide, such as combustion gas, to separate and recover carbon dioxide.

Description of the Related Art

In thermal power stations, ironworks, boilers and other facilities, fuels such as coal, heavy oil and extra heavy oil are used in a large quantity. Sulfur oxides, nitrogen oxides, and carbon dioxide discharged by the burning of the fuels need quantitative and concentration limitations with respect to the release thereof from the viewpoint of prevention of air pollution and conservation of global environment. In recent years, carbon dioxide has been regarded as a problem as it is the main cause of global warming, so that a movement of suppressing the emissions thereof in the world has been becoming activated. Thus, various researches have been actively promoted for making it possible to recover and store carbon dioxide from combustion exhaust gas or process exhaust gas without discharging carbon dioxide into the atmosphere. Combustion exhaust gas contains not only carbon dioxide and water but also nitrogen oxides, sulfur oxides, mercury, hydrogen chloride, ash dusts (particulate matters) and the like as minor components. It is therefore important from the viewpoint of environmental conservation to decrease the quantity of impurities contained in the carbon dioxide recovered from the exhaust gas to increase the purity of carbon dioxide.

Of the nitrogen oxides contained in combustion exhaust gas, nitrogen dioxide is removable by a wet absorption processing using an alkaline agent. However, nitrogen monoxide is poorly soluble in water. Thus, many of ordinarily performed denitration techniques are based on a dry-type ammonia catalytic reduction method, and nitrogen oxides are reduced by catalytic reaction by supplying ammonia or some other hydrogen source. When a desulfurization and denitration apparatus is formed on the basis of such a technique, in its desulfurization unit, sulfur oxides in an exhaust gas are processed in the state of ammonium salts.

In the meantime, about the desulfurization methods, various wet or dry processing techniques have been researched for removing sulfur oxides, using an alkaline desulfurizing agent. For example, Publication Document 1 listed below describes an exhaust gas wet processing method of bringing the exhaust gas and slurry containing a desulfurizing agent into liquid-gas contact with each other, in which carbon dioxide is recovered by desulfurization of the exhaust gas. Examples of the alkaline agent usable in such a desulfurization method include sodium hydroxide (or sodium carbonate), limestone (or slaked lime or dolomite), and magnesium hydroxide. Although sodium hydroxide is very high in efficiency of removing the sulfur oxides, it is expensive to increase costs for the processing. It is therefore general to apply, to large-sized plants such as thermal power stations, a limestone/gypsum method, in which limestone (calcium carbonate) or slaked lime (calcium hydroxide), which is inexpensive, is used.

As a method in which a hydrogen source or a desulfurizing agent as described above is not used, suggested is a method of pressurizing the exhaust gas, and then cooling it to condense the water content in the exhaust gas (see Publication document 2 listed below). In this method, sulfur oxides and nitrogen oxides contained in the pressurized exhaust gas are dissolved in the condensed water, and denitration and desulfurization of the exhaust gas are performed by separating the condensed water from the exhaust gas.

DOCUMENTS LIST

Publication Document 1: Japanese Patent Application Laid-Open (JP-A) No. 2012-106163
Publication Document 2: PCT International Publication pamphlet of WO 2012/107953

BRIEF SUMMARY

In the technique of Publication Document 2, by pressurizing and cooling an exhaust gas, sulfur oxides and nitrogen oxides are removed together with condensed water. Thus this technique does not require any chemical agent such as the desulfurizing agent, etc. However, acids (sulfuric acid and sulfurous acid) generated from the sulfur oxides easily damage the compressor and other equipment. Accordingly, if this technique is used singly to attain desulfurization and denitration, a large burden is imposed onto the apparatus to cause a problem about costs for maintaining the facilities. It is also difficult to attain the desulfurization and the denitration with a high removing efficiency. In the meantime, about denitration methods, a reduction method in which a hydrogen source such as ammonia is used makes difficult the reduction in the processing cost. Thus it is desired that the nitrogen oxides can be processed without using such a resource. In connection with this point, since the desulfurization method according to the limestone/gypsum method makes use of relatively inexpensive limestone as an absorbent, it is an advantageous desulfurization method for processing costs and is thus favorable for economy.

In order to spread the processing of exhaust gas, economy is important. To increase the economic efficiency in the whole of an exhaust gas processing process, it is important to increase the economic efficiency in each of the processing techniques performed in the processing process. After being subjected to desulfurization and denitration, the exhaust gas contains carbon dioxide as a main component and carbon dioxide is stored in the ground under the present circumstances. However, if an effective use of recovered carbon dioxide is realized, it increases the economic efficiency. Carbon dioxide recovered from the desulfurized and denitrated exhaust gas contains argon, oxygen, nitrogen and the like in a small proportion. If carbon dioxide of high purity can be efficiently recovered, it can be supplied to the market as liquefied carbon dioxide or such a product, to result in industrial usefulness. At this time, in order that such a technique becomes advantageous economically, the recovery efficiency of the carbon dioxide of high purity is important.

In a desulfurization method according to the limestone/gypsum method, when a slurry in which an absorbent is dispersed in water is used as an absorbing liquid to capture sulfur oxides in the exhaust gas, the absorbing liquid is deprived of water content if the slurry contacts the exhaust gas with a high temperature that is introduced from a combustion system, so that fine solid particles are scattered and entrained in the exhaust gas easily. Such scattered particles easily cause a failure of wear and breakdown in the subsequent machinery. If a filtrating member such as a filter bag or the like is used to separate the scattered particles from the exhaust gas, ventilation resistance of the exhaust gas becomes very large so that energy and power device becomes necessary for urging the gas flow. Accordingly, when the desulfurization method according to the limestone/gypsum-method is used in the exhaust gas processing process, it is also important to devise so as to address the problem of scattered particles as described above.

An object of the disclosure is to solve the above-mentioned problems and provide an exhaust gas processing system and a processing method that are excellent in economic efficiency and that are capable of efficiently recovering carbon dioxide with high purity, with use of desulfurization technique according to the limestone/gypsum method.

Another object of the disclosure is to provide an exhaust gas processing system and a processing method with less damage and troubles of the equipment when processing the exhaust gas, which enable to attain the desulfurization and denitration of the exhaust gas efficiently to recover carbon dioxide with high purity and which make possible to decrease the energy necessary for the processing.

Still another object of the disclosure is to provide an exhaust gas processing system and a processing method that installation conditions and installation environment are not restricted, that operating costs can be decreased, and that maintenance and management are easy.

In order to solve the above-mentioned problems, the inventors have conducted eager researches to find out that, using the construction of the desulfurization method according to the limestone/gypsum method, efficient recovering of carbon dioxide with high purity is possible, and then achieved the present technology. At this time, the problem of scattered particles in the limestone/gypsum method can be solved by a simple configuration, and it has also achieved to effectively implement the processing of the exhaust gas while using energy efficiently in combination with the configuration according to the pressurization and cooling.

According to an aspect of the disclosure, an exhaust gas processing system comprises: a desulfurization unit that removes a sulfur oxide from an exhaust gas according to the limestone/gypsum method; a denitration unit arranged in a subsequent stage of the desulfurization unit to remove a nitrogen oxide from the exhaust gas; a carbon dioxide recovery unit arranged at a subsequent stage of the denitration unit to recover carbon dioxide from the exhaust gas; and an oxygen supply unit that supplies a fraction of a post-recovery gas discharged from the carbon dioxide recovery unit as an oxygen source to the desulfurization unit.

Moreover, according to an aspect of the disclosure, an exhaust gas processing method comprises: a desulfurization processing to remove a sulfur oxide from an exhaust gas according to the limestone/gypsum method; a denitration processing to remove a nitrogen oxide from the exhaust gas; a carbon dioxide recovery processing to recover carbon dioxide from the exhaust gas; and an oxygen supply processing to supply a fraction of a post-recovery gas discharged by the carbon dioxide recovery processing, to the desulfurization processing as an oxygen source.

In the exhaust gas processing system, the oxygen supply unit may include: a monitor having an analyzer for monitoring the purity and the recovery ratio of the recovered carbon dioxide recovered by the carbon dioxide recovery unit; and an adjusting apparatus that adjusts the proportion of the post-recovery gas to be supplied to the desulfurization unit of the post-recovery gas discharged from the carbon dioxide recovery unit, based on the purity and the recovery ratio of the recovered carbon dioxide that are monitored by the monitor. The adjusting apparatus may be set to compare the purity of the recovered carbon dioxide and the recovery ratio of the carbon dioxide that are monitored by the monitor, with a target purity and a target recovery ratio, and to perform at least one of an adjustment to decrease the proportion of the post-recovery gas to be supplied to the desulfurization unit when the monitored purity of the recovered carbon dioxide is lower than the target purity, and an adjustment to increase the proportion of the post-recovery gas to be supplied to the desulfurization unit when the monitored recovery ratio of the recovered carbon dioxide is lower than the target recovery ratio.

Moreover, the monitor may further include an analyzer for monitoring the concentration of sulfur dioxide in the exhaust gas discharged from the desulfurization unit, and the adjusting apparatus may be configured to compare the sulfur dioxide concentration in the exhaust gas that is monitored by the monitor, with a target sulfur dioxide concentration, and to perform an adjustment to increase the proportion of the post-recovery gas to be supplied to the desulfurization unit when the monitored sulfur dioxide concentration in the exhaust gas is higher than the target sulfur dioxide concentration. Further, the oxygen supply unit may include a separator for separating carbon dioxide from the post-recovery gas discharged from the carbon dioxide recovery unit, and a carbon dioxide supply unit that supplies the carbon dioxide separated by the separator to the denitration unit, and the oxygen supply unit is allowed to supply a fraction of the post-recovery gas from which the carbon dioxide has been separated by the separator to the desulfurization unit.

In the above-mentioned structure, the desulfurization unit may include a desulfurizer that removes the sulfur oxide from the exhaust gas with use of an absorbing liquid containing a calcium compound, and a washing apparatus that wash the exhaust gas discharged from the desulfurizer with use of washing water, thereby removing calcium-containing particles contained in the exhaust gas, and the oxygen supply unit is allowed to supply a fraction of the post-recovery gas to the absorbing liquid in the desulfurizer. In accordance with the above, it is possible to overcome the problem of scattered particles in the desulfurizer.

The denitration unit may include a reactor that advances an oxidation reaction to produce nitrogen dioxide from nitrogen monoxide, and a denitration apparatus that removes nitrogen dioxide from the exhaust gas with use of an aqueous absorbing liquid. In one embodiment thereof, such a configuration is possible that the reactor may include at least one compressor for compressing the exhaust gas discharged from the desulfurization unit, and that the denitration unit may further include at least one cooler for cooling the exhaust gas pressurized by the at least one compressor. In another embodiment thereof, such a configuration is possible that the desulfurization unit may further include a first reactor arranged in a preceding stage of the desulfurizer and advancing an oxidation reaction to produce sulfur trioxide from sulfur dioxide, and the denitration unit may include a second reactor arranged in a subsequent stage of the desulfurization unit and advancing an oxidation reaction to produce nitrogen dioxide from nitrogen monoxide, and a denitration apparatus that remove nitrogen dioxide from the exhaust gas with use of an aqueous absorbing liquid.

The exhaust gas processing system may be configured to further include a drying unit that removes water from the exhaust gas, and a mercury removing unit that removes mercury form the exhaust gas, so that carbon dioxide with high purity can be efficiently recovered.

According to the disclosure, previous cooling of the exhaust gas is unnecessary and efficient recovery of high purity carbon dioxide is possible with use of the configuration of a desulfurization processing according to the a limestone/gypsum method. Thus it is advantageous in development of the use of the recovered carbon dioxide. Moreover, since the problem of scattered particles in the exhaust gas processing can be eliminated by a simple technique, it contributes to a decrease in operating costs for the exhaust gas processing to improve economic efficiency. Installation conditions, etc. of the system are not unnecessarily limited, and it is possible to perform efficiently the desulfurization and the denitration of an exhaust gas without increasing of the processing costs. Accordingly, it contributes to installation of the processing system and spread of the processing method, for an exhaust gas containing carbon dioxide such as oxygen combustion gas and the like, and it is therefore useful in responding to environmental issues. Since it can be carried easily by using ordinary facilities without requiring special equipment or expensive device, it is economically advantageous.

BRIEF DESCRIPTION OF THE DRAWINGS

The features and advantages of the exhaust gas processing system and processing method according to the disclosure will more clearly understood from the following description of the conjunction with the accompanying drawings in which identical reference letters designate the same or similar elements or cases throughout the figures and in which.

DETAILED DESCRIPTION OF EMBODIMENTS

Figure 1:
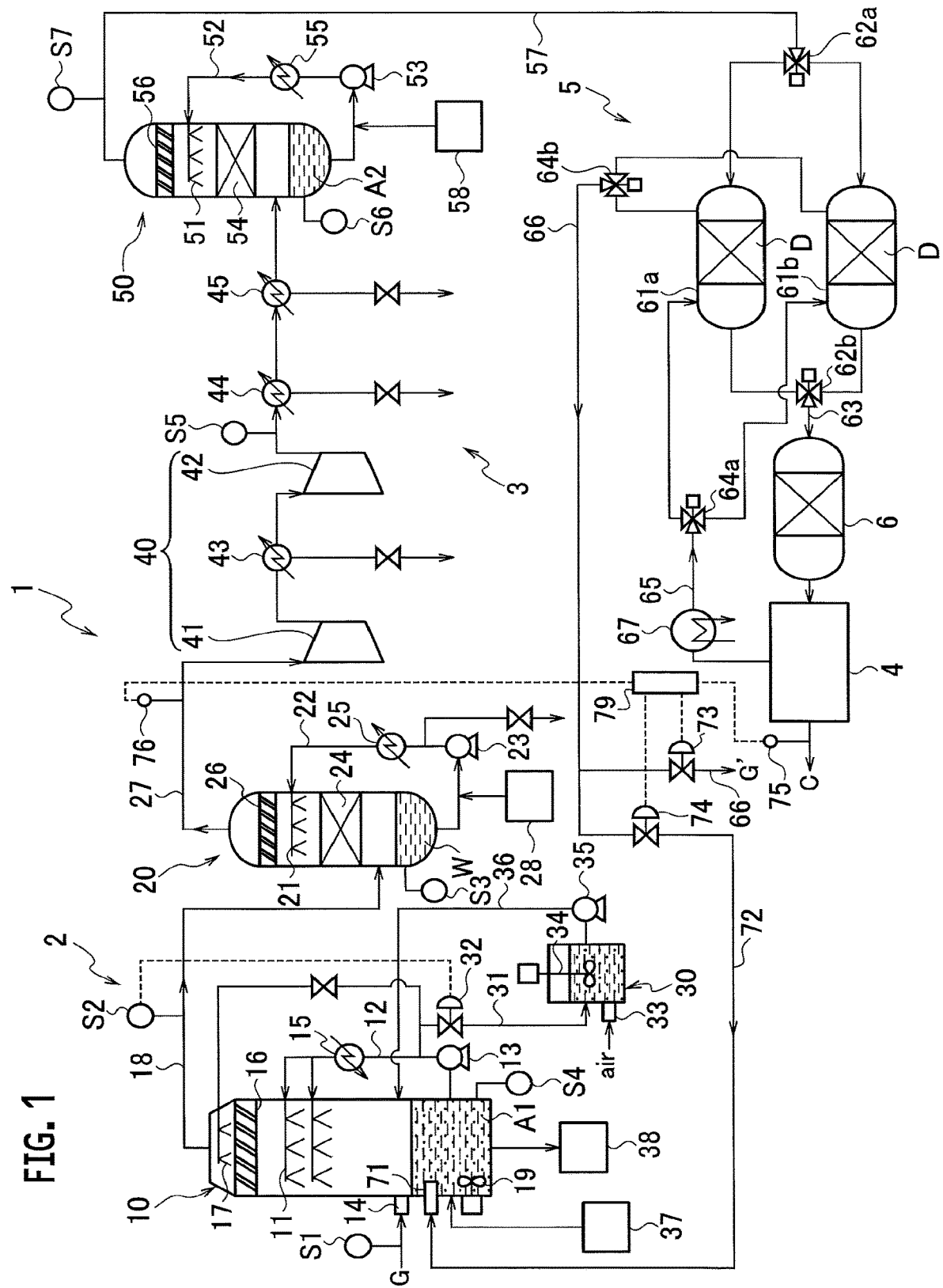
FIG. 1 is a schematic structural view illustrating an embodiment of the exhaust gas processing system according to the disclosure.

Main components of combustion gas and the like exhaust gases are water and carbon dioxide, and they further contain, as impurities, sulfur oxides, nitrogen oxides, hydrogen chloride, oxygen, mercury, soot and dust (particulate matters) and the like in a small proportion, and also contain inert argon and nitrogen. The amount of oxygen remaining in exhaust gases is varied in accordance with the combustion conditions, but the oxygen content may be approximated at about 5% and it is similar in the exhaust gases that the above-mentioned impurities are contained in a small proportion. Accordingly, oxygen and the like remain in a small proportion in the exhaust gas after subjected to desulfurization and denitration. Thus, if carbon dioxide in the exhaust gas is refined and recovered with high purity, carbon dioxide containing oxygen, argon and nitrogen in a high concentration is discharged as the purification residue after the recovery. In order to increase the recovery efficiency of the carbon dioxide, it is necessary to decrease the proportion of the impurities contained in the exhaust gas after subjected to the desulfurization and denitration. In particular, decrease of the oxygen concentration is important since the oxygen concentration affects the purification efficiency in the purification of the carbon dioxide.

In the meantime, oxygen is a component usable in the processing for the desulfurization and the denitration of the exhaust gas. Firstly, in the desulfurization processing according to the limestone/gypsum method, oxygen is usable as an oxidation source for depositing and separating, as calcium sulfate, sulfite ions produced from sulfur dioxide in the exhaust gas. Secondly, oxygen is an element necessary for making it possible to adopt a wet processing as a method for denitrating the exhaust gas. The sulfur oxides (SOx) include sulfur dioxide, sulfur trioxide and the like, and these oxides are each soluble in water. Meanwhile, the nitrogen oxides (NOx) are mainly present as nitrogen monoxide or nitrogen dioxide. Since nitrogen monoxide is insoluble in water, a wet processing is inapplicable as it is. However, if nitrogen monoxide is oxidized to nitrogen dioxide, which is water-soluble, the nitrogen oxides are removable by a wet-type denitration processing using water.

In the present disclosure, a desulfurization processing is adopted according to the limestone/gypsum method, and in the desulfurization processing, a post-recovery gas discharged as purified residue after the recovery of carbon dioxide is partially used as an oxygen source for oxidizing sulfite ions produced from sulfur dioxide in the exhaust gas. That is, as the firstly-mentioned oxygen source, oxygen contained in the post-recovery gas is used. Since the main component of the post-recovery gas is carbon dioxide, the configuration is made in such a manner that the post-recovery gas that has undergone the oxidation of sulfite ions in the absorbing liquid is allowed to flow again in the processing process, thereby recovering the carbon dioxide again. This is favorable also for the purification efficiency of the carbon dioxide. The reason why the post-recovery gas is used not wholly but partially is to avoid extreme increase in the concentration of argon and nitrogen, which are impurities other than oxygen, due to enrichment thereof in the exhaust gas after subjected to the processing for the desulfurization and the denitration.

That is, the exhaust gas processing system according to the present disclosure has a desulfurization unit which removes a sulfur oxide from an exhaust gas according to the limestone/gypsum method; a denitration unit which removes a nitrogen oxide from the exhaust gas; a carbon dioxide recovery unit which recovers carbon dioxide from the exhaust gas; and an oxygen supply unit which supplies a fraction of a post-recovery gas discharged from the carbon dioxide recovery unit, as an oxygen source, into the desulfurization unit. The denitration unit is arranged in a subsequent stage of the desulfurization unit, and the carbon dioxide recovery unit is arranged in a subsequent stage of the denitration unit. The desulfurization unit according to the limestone/gypsum method has a desulfurizer in which an absorbing liquid containing a calcium compound is used to remove the sulfur oxide from the exhaust gas. Oxygen contained in the post-recovery gas is supplied to the absorbing liquid in the desulfurizer, and sulfite ions generated from the absorbed sulfur oxides are oxidized to calcium sulfate. The main component of the post-recovery gas in which oxygen has been consumed is carbon dioxide, so that the carbon dioxide concentration in the exhaust gas to be supplied to the carbon dioxide recovery unit increases. Thus, the efficiency is improved in recovery of high-concentration carbon dioxide by purification.

The desulfurization processing according to the limestone/gypsum method has a problem that scattered particles generated at the time of contacting the exhaust gas with a high temperature cause a failure to subsequent equipment. In order to solve this problem, the system for processing the exhaust gas is configured by interposing between its components a washing apparatus which washes the scattered particles with water to remove. The washing apparatus has a simple structure and it makes possible to collect the scattered particles without increasing the ventilation resistance of the exhaust gas, so that consumption of power is possibly suppressed. In this way, it is possible to prevent a failure caused by the scattered particles in subsequent equipment. Thus, a pressurizing device such as a compressor can be arranged subsequently so as to pressurize the exhaust gas. When the exhaust gas is pressurized, an oxidation reaction by which nitrogen monoxide is converted to nitrogen dioxide is advanced by the oxygen remaining in the exhaust gas. Thus a wet-type denitration processing using washing water becomes possible. In regard to the sulfur oxides, although sulfuric acid arising from water vapor and the sulfur trioxide produced by the oxidation reaction is prone to damage the compressor or the like by corroding the metal, the corrosion by sulfuric acid is avoidable even when the pressurizing device is used since the exhaust gas is previously subjected to the desulfurization processing. Accordingly, it is possible to remove nitrogen oxides economically in combination of the oxidation of nitrogen monoxide by using the progress of the oxidation reaction through the pressurization, and the wet-type denitration processing. This is very advantageous as compared with the case of applying a denitration processing according to the reduction method. As a result, the desulfurization and the denitration can be inexpensively and safely attained by subjecting the exhaust gas to the desulfurization processing according to the limestone/gypsum method, the oxidation reaction with pressurization, and the wet-type denitration processing. This configuration also makes it possible to use oxygen in the post-recovery gas as the secondly-mentioned oxidizing source, that is, the oxidizing source for the oxidation reaction through pressurization.

Hereinafter, embodiments of the exhaust gas processing system of the present disclosure will be described with reference to the attached drawings. In the drawings, any line represented by a broken line indicates an electric connection.

FIG. 1 illustrates the first embodiment of the exhaust gas processing system according to the present disclosure. A processing system 1 has a desulfurization unit 2 which removes a sulfur oxide from exhaust gas G, a denitration unit 3 arranged in a subsequent stage of the desulfurization unit 2 to remove nitrogen oxides from exhaust gas G, and a carbon dioxide recovery unit 4 arranged in a subsequent stage of the desulfurization unit 2 and the denitration unit 3 to recover carbon dioxide from the exhaust gas G. Furthermore, the processing system 1 has a drying unit 5 which removes water content from the exhaust gas, and a mercury removing unit 6 which removes mercury from the exhaust gas, between the denitration unit 3 and the carbon dioxide recovery unit 4.

The desulfurization unit 2 comprises a desulfurizer 10 which removes a sulfur oxide from exhaust gas G with use of absorbing liquid A1, and a washing apparatus 20 which washing the exhaust gas discharged from the desulfurizer 10 with use of washing water W. The desulfurizer 10 is a device that performs a desulfurization processing according to the limestone/gypsum method, and that uses, as absorbing liquid A1, an aqueous dispersion liquid containing a calcium compound such as limestone and the like as alkaline absorbents for absorbing the sulfur oxide. The desulfurizer 10 has therein a spraying device which sprays the absorbing liquid A1 in the form of droplets in the exhaust gas G. Specifically, a spray nozzle 11 for spraying the absorbing liquid A1 is provided on the upper part of the inside of the desulfurizer 10, and a circulating path 12 is provided on the outside of the desulfurizer 10 to connect the bottom and the upper part thereof with each other. Absorbing liquid A1 sprayed from the spray nozzle 11 and stored on the bottom of the desulfurizer 10 is recirculated to the spray nozzle 11 by the driving of a pump 13 on the circulating path 12, and the absorbing liquid A1 is repeatedly sprayed. Exhaust gas G is introduced from a gas inlet portion 14 below the spray nozzle 11, and a gas-liquid contact phase that brings the exhaust gas G into contact with absorbing liquid A1 is produced by the spray of absorbing liquid A1 between the spray nozzle 11 and the gas inlet portion 14. An analyzer S1 is provided in order to measure the nitrogen oxide concentration and the sulfur dioxide concentration in the exhaust gas G to be introduced into the desulfurizer 10. By the contact between the exhaust gas G and the absorbing liquid A1, the sulfur oxides contained in the exhaust gas G are absorbed into the absorbing liquid A1 to produce calcium salts. At this time, sulfur dioxide is dissolved as sulfite ions in the absorbing liquid A1. In the meantime, sulfur trioxide is absorbed into absorbing liquid A1 and then makes gypsum (calcium sulfate) which is dispersed and precipitated. Hydrogen chloride and other acidic halides contained in the exhaust gas G are also absorbed into absorbing liquid A1. Furthermore, an advantage of washing and removing soot and dust is also obtained. The arrangement of the gas inlet portion 14 may be changed so as to blow the exhaust gas G into absorbing liquid A1 stored in the bottom part. A water-cooling type cooler 15 is provided on the circulating path 12, and the absorbing liquid A1 in the desulfurizer 10 is cooled through the cooler 15 while it is circulated in the circulating path 12, thereby increase of the liquid temperature is prevented. Furthermore, an inlet portion 71 is provided for supplying a fraction of post-recovery gas G' discharged from the carbon dioxide recovery unit 4 to the absorbing liquid A1 in the bottom part of the desulfurizer 10, and a branch pipe 72 is connected to the inlet portion 71, wherein the pipe 72 is branched from a pipe 66 (details thereof will be described later) through which the post-recovery gas G' is discharged. Flow rate adjusting valves 73 and 74 for adjusting gas flow rate are fitted to the pipe 66 and the branch pipe 72, respectively, and, by adjusting these opening, the flow rate adjusting valves 73 and 74 function as an adjustment device for adjusting the distribution ratio of the fraction of post-recovery gas G' to be supplied to the desulfurization unit in the post-recovery gas G' discharged from the carbon dioxide recovery unit 4. Oxygen contained in the post-recovery gas G' oxidizes sulfite ions dissolved in the absorbing liquid A1 to sulfate ions, so that the sulfur oxides are deposited as calcium sulfate. The post-recovery gas G' from which oxygen has been consumed, being composed mainly of carbon dioxide, emerges out of the absorbing liquid A1 to be contained in the exhaust gas G from which the sulfur oxides have been removed.

The exhaust gas G is cooled by the sprayed absorbing liquid A1. If the introduced exhaust gas G is high in temperature, water in the sprayed absorbing liquid is vaporized by a rise in the temperature of the liquid, so that components contained in the absorbing liquid turn to fine solid particles (mist) and they are scattered and entrained in the exhaust gas G. The components of the scattered particles are calcium-containing solids such as limestone, gypsum, and calcium sulfite. In order to suppress these solid particles to some extent from being discharged to the outside with the entrainment in the exhaust gas G, a mist removing member 16 is arranged above the spray nozzle 11, and the exhaust gas G passing through the gas-liquid contact phase to rise up passes through the mist removing member 16 before discharged from the desulfurizer 10. The mist removing member 16 comprises a horizontal layer of a plurality of oblique plates arranged in parallel to each other with providing gaps between them. The multiple oblique plates are inclined with respect to the passage direction (the vertical direction) of the exhaust gas G, so that the solid particles contained in the exhaust gas G are easy to collide with the oblique plates. When the mist removing member 16 is configured to have a height (the vertical direction) of about 150 to 250 mm and a gap (ventilation width) of about 50 to 100 mm between the oblique plates, this configuration is preferred to remove the particles effectively while suppressing the increase of the ventilation resistance of the exhaust gas. In order to remove the particles effectively, it is preferred that the inclined angle of the oblique plates (with respect to the vertical direction) is about from about 20 to 45 degrees. If the colliding solid particles deposit onto the oblique plates, the mist removing member 16 may be blocked. Thus a washing nozzle 17 for washing the deposition is located above the mist removing member 16. The washing nozzle 17 is used in the state that the supply of exhaust gas G and the desulfurization processing are stopped. The supernatant of the absorbing liquid A1 stored in the bottom part of the desulfurizer 10 is supplied to the washing nozzle 17 to wash the mist removing member 16.

A washing apparatus 20 is arranged in a subsequent stage from the desulfurizer 10, and the exhaust gas G discharged from the desulfurizer 10 is supplied through a pipe 18 to the washing apparatus 20. An analyzer S2 is provided on the pipe 18 to measure the sulfur dioxide concentration in the exhaust gas G. The washing apparatus 20 is provided in order to remove sufficiently from the exhaust gas G, scattered particles that cannot be sufficiently removed by the mist removing member 16 of the desulfurizer 10, and it is configured as a washing apparatus for washing the exhaust gas G discharged from the desulfurizer 10, using washing water W. Thus, calcium-containing particles contained in the exhaust gas G are removed. Moreover, hydrogen chloride and soot and dust contained in the exhaust gas G are also taken into the washing water. The exhaust gas G is cooled by the washing.

The washing apparatus 20 is configured as follows. A spray nozzle 21 for spraying washing water W is located at the inside of the upper part of the washing apparatus 20. A circulating path 22 is located outside the apparatus to connect the bottom part and the upper part thereof with each other. For the washing water W, water is preferably used, and, if an aqueous solution of a highly water-soluble alkali agent is used as the washing water W, performance of capturing the scattered particles (calcium compound) is improved and it also exhibits desulfurization and denitration effects. A pump 23 is provided on the circulating path 22, and, by the driving thereof, washing water W is sprayed from the spray nozzle 21 and stored in the bottom part of the washing apparatus 20. The washing water W is then recirculated to the spray nozzle 21 through the circulating path 22 to repeat the spray of washing water W. Below the spray nozzle 21, a filling material 24 is loaded to promote the contact between the exhaust gas G and the washing water W. By spraying the washing water W from the spray nozzle 21 and introducing the exhaust gas G from the bottom part of the washing apparatus 20, the exhaust gas G and the washing water W contact each other in gaps in the filling material 24 so that the scattered particles contained in the exhaust gas G are captured and washed with the washing water W. Moreover, washing water W absorbs acidic halides such as hydrogen chloride, the remaining portion of sulfur oxides, and nitrogen dioxide each contained in the exhaust gas G. A water-cooling type cooler 25 is provided on the circulating path 22 so that the washing water W circulating in the circulating path 22 is cooled to prevent a rise in the temperature of washing water W inside the washing apparatus 20. Thus, the temperature is kept at an appropriate temperature. Above the spray nozzle 21, a mist removing member 26 is arranged to suppress fine droplets or the like of the washing water W from being entrained in the exhaust gas G and discharged to the outside. In same manner as the mist removing member 16 of the desulfurizer 10, the mist removing member 26 may comprise a horizontal layer of a plurality of oblique plates arranged in parallel to each other with providing gaps between them. However, the mist removing member 26 may be in other forms, and it may be configured with, for example, a net-like member, a porous thin plate or the like. The exhaust gas G that has passed through the mist removing member 26 is discharged from the washing apparatus 20 through a pipe 27. As the washing processing advances, the calcium compound is incorporated into the washing water W, and the alkali agent is consumed by neutralizing the absorbed acidic substances. Accordingly, a tank 28 is additionally provided to accommodate washing water of the refill or an alkali agent aqueous solution having a high concentration. As required, the used washing water is discharged through the circulating path 22 from a drain and the fresh washing water or alkali agent is replenished from the tank 28 through the circulating path 22 into the washing apparatus 20.

Washing water W used in the washing apparatus 20 is preferably a substantially neutral or basic aqueous solution having a pH adjusted to about 5 to 9. If an aqueous solution containing an alkali agent is used as the washing water W, it is possible to supplement the desulfurization function of the desulfurizer 10, and the desulfurization and the removal of the acidic substances can be performed with a higher precision. The alkali agent is preferably, for example, an alkali metal hydroxide such as sodium hydroxide. An analyzer S3 to measure the pH of washing water W is placed on the bottom of the washing apparatus 20.

In the desulfurizer 10, sulfur dioxide absorbed from exhaust gas G is dissolved as a sulfite ion in the absorbing liquid A1, and then oxidized by oxygen contained in the post-recovery gas G' supplied from the branch pipe 72. In this regard, since the supply amount of the post-recovery gas G' is adjusted in accordance with the condition of the exhaust gas G discharged from the desulfurization unit 2 (details thereof will be described later), there may be a case where the supply amount of oxygen is insufficient. In order to cope with this matter, an oxidizing tank 30 is provided. The absorbing liquid A1 flowing in the circulating path 12 is partially supplied through a branch path 31 into the oxidizing tank 30, and an on-off valve 32 to control the supply is provided on the branch path 31. The oxidizing tank 30 is provided with an inlet portion 33 to introduce an oxygen-containing gas such as air, thereby sulfurous acid in the absorbing liquid A1 is sufficiently oxidized to sulfuric acid. By driving a pump 35, the absorbing liquid in the oxidizing tank 30 is supplied through a circulating path 36 to the desulfurizer 10. The air in which oxygen has been consumed, whose main component is nitrogen, is discharged from the oxidizing tank 30 to the outside. The on-off valve 32 is electrically connected to the analyzer S2. Based on signal data from the analyzer S2, the on-off valve 32 is adjusted to increase the opening degree of the on-off valve 32 when the sulfur dioxide concentration in exhaust gas G flowing in the pipe 18 exceeds a predetermined level, so as to increase the flow rate of the absorbing liquid A1 to be supplied into the oxidizing tank 30 and promote the oxidation of sulfur dioxide. Calcium sulfate produced by the oxidation in the oxidizing tank 30 precipitates from absorbing liquid A1. Accordingly, sulfites, sulfates and the like, that are produced from calcium ions eluting out from the absorbent and from the sulfur oxides absorbed from exhaust gas G in the desulfurizer 10, precipitate finally as gypsum (calcium sulfate) from absorbing liquid A1, and then they are recovered through solid-liquid separation in a gypsum separator 38. The liquid separated from the gypsum can be appropriately returned to the desulfurizer 10, or it may be supplied as water for dissolving limestone or supplied as a washing liquid to the washing nozzle 17. In the oxidizing tank 30, a stirrer 34 is provided for stirring the absorbing liquid and the oxidation reaction proceeds uniformly in the absorbing liquid by homogeneously mixing and stirring the absorbing liquid. The absorbent in the absorbing liquid is consumed as the desulfurization processing advances. Therefore, a tank 37 which accommodates slurry that the absorbent is dispersed in a high content is additionally provided, and the absorbent is appropriately replenished from the tank 37 into the desulfurizer 10. The absorbent supplied to the desulfurizer 10 is mixed into the absorbing liquid A1 in a homogenous form by a stirrer 19 provided on the bottom part of the desulfurizer 10. An analyzer S4 is set in the bottom part of the desulfurizer 10 to measure the pH of absorbing liquid A1.

It is noted that a modification is also possible to separate and recover, in the oxidizing tank 30, the gypsum precipitating from the absorbing liquid to which oxygen has been supplied. In this case, the stirring in the oxidizing tank 30 is interrupted and the supernatant liquid of the absorbing liquid is returned to the desulfurizer 10, then the gypsum is recovered. The supernatant of the absorbing liquid is suitable for use as washing water for washing the mist removing member 16 of the desulfurizer 10. Thus such a configuration may be well that the circulating path 36 is branched and connected to the washing nozzle 17 which is set above the mist removing member 16, so as to supply the supernatant in the oxidizing tank 30 partially to the washing nozzle 17. Alternatively, the absorbing liquid in the oxidizing tank 30 may be appropriately fed out into the gypsum separator 38 to recover the gypsum.

In a subsequent stage from the desulfurization unit 2, the denitration unit 3 is arranged to remove the nitrogen oxides from the exhaust gas G. The denitration unit 3 has a reactor 40 which advances an oxidation reaction to produce nitrogen dioxide from nitrogen monoxide, and a denitration apparatus 50 which removes nitrogen dioxide from the exhaust gas, using an aqueous absorbing liquid. Of the nitrogen oxides contained in the exhaust gas, nitrogen monoxide, which is water-insoluble, is converted to nitrogen dioxide to increase the denitration efficiency of the denitration apparatus 50. As the reactor 40, a pressurizable means for the exhaust gas may be utilized. Specifically, at least one compressor is used for compressing the exhaust gas G discharged from the desulfurization unit 2, and the reactor 40 in the processing system 1 in FIG. 1 comprises a first compressor 41 and a second compressor 42. Through the first compressor 41 and the second compressor 42, the exhaust gas G discharged from the desulfurization unit 2 is pressurized stepwise so that oxygen and the nitrogen oxides contained in the exhaust gas G act to each other by the pressurization through the compressors, whereby a reaction of oxidizing nitrogen monoxide to nitrogen dioxide proceeds. Therefore, the nitrogen monoxide concentration in the pressurized exhaust gas G is decreased while the nitrogen dioxide concentration therein is raised. Moreover, if the sulfur oxides remain in the exhaust gas G, the oxidation of the sulfur oxides also advances so that sulfur dioxide is oxidized to sulfur trioxide. The temperature of the pressurized exhaust gas G becomes high. However, the denitration unit 3 in the present disclosure further has at least one cooler which cools the pressurized exhaust gas, and the exhaust gas G is cooled to an appropriate temperature. Specifically, a first cooler 43 and a second cooler 44 are located, respectively, in the stage subsequent to each of the first compressor 41 and the second compressor 42, so that compression and cooling are alternately repeated. The cooling of the first cooler 43 and the second cooler 44 may be either of a cooling system using a water cooling manner, or other cooling using a different coolant, and any cooling device of a structure having a drain function of subjecting a condensate generated by the cooling to gas-liquid separation, and discharging the condensate is allowed to use. For example, ordinary coolers or heat exchangers may be connected to gas-liquid separators, and they may be used as the first cooler 43 and the and second cooler 44. When the pressurized exhaust gas G is cooled through the first cooler 43 and the second cooler 44, water vapor contained in the exhaust gas G condenses so that water is separated therefrom. Then the water-soluble components contained in the exhaust gas G are dissolved in the water. In other words, nitrogen dioxide in the exhaust gas shifts into the condensed water, and, when the sulfur oxides and the like remain therein, these are also dissolved in the condensed water, so that the nitrogen oxides and other water-soluble impurities in the exhaust gas G are lowered in concentration. Consequently, the condensed water generated by the cooling through the first cooler 43 and the second cooler 44 is separated and removed from exhaust gas G, thereby recovering exhaust gas G in which the nitrogen oxides and other impurities have been decreased in concentration. In this way, the plural condensers and the plural coolers are alternately arranged to repeat compressing and cooling of the exhaust gas alternately, whereby the advance of the oxidation reaction and the dissolution/removal of the oxidation products are repeated to decrease the concentrations of the nitrogen oxides, the sulfur oxides and other water-soluble impurities in exhaust gas G stepwise. An analyzer 55 is located in a subsequent stage from the reactor 40 to measure the nitrogen oxide concentration in exhaust gas G.

In the processing system 1 in FIG. 1, in order to adjust the temperature of the exhaust gas G to a temperature suitable for the processing temperature in the denitration apparatus 50, a third cooler 45 having a drain function in the same manner as the first and second coolers 43 and 44 have is provided in front of the denitration apparatus 50 so that the exhaust gas G is sufficiently cooled to an appropriate temperature. Since the third cooler 45 is lower in cooling temperature than the first and second coolers 43 and 44, it is preferable to use a cooler of the cooling manner that is capable of cooling to a lower temperature, and it may be a heat pump using a coolant, or the like.

The denitration apparatus 50 in the processing system 1 of the present disclosure is an apparatus for conducting a wet processing, and a substantially neutral or basic aqueous solution having a pH of about 5 to 9 is used as absorbing liquid A2. The absorbing liquid A2 contains an alkali metal compound such as sodium hydroxide and the like as a strongly alkaline absorbent which absorbs nitrogen oxide (nitrogen dioxide). The quantity of the absorbent is suitably adjusted, based on the pH detected by the analyzer S6. The denitration apparatus 50 has a spray means which sprays the absorbing liquid A2 in a droplet form to the exhaust gas G. Specifically, the upper part of the inside of the denitration apparatus 50 is provided with a spray nozzle 51 for spraying absorbing liquid A2, and a circulating path 52 is provided at the outside to connect the bottom part and the upper part of the apparatus. The absorbing liquid A2 sprayed from the spray nozzle 51 and stored in the bottom part of the denitration apparatus 50 is recirculated to the spray nozzle 51 by driving a pump 53 on the circulating path 52, so that the absorbing liquid A2 is repeatedly sprayed. Below the spray nozzle 51, a filling material 54 is loaded to produce a gas-liquid contact phase that brings the exhaust gas G into contact with absorbing liquid A2. By spraying the absorbing liquid A2 from the spray nozzle 51 and introducing the exhaust gas G from the bottom part of the denitration apparatus 50, the exhaust gas G and the absorbing liquid A2 contact each other in gaps in the filling material 54 so that nitrogen dioxide contained in the exhaust gas G is absorbed into the absorbing liquid A2 to be dissolved therein as a nitrate. Moreover, the absorbing liquid A2 also absorbs the acidic halides such as hydrogen chloride and the remaining sulfur oxides that are contained in the exhaust gas G. A water-cooling type cooler 55 is provided on the circulating path 52 so that the absorbing liquid A2 circulating in the circulating path 52 is cooled to prevent a rise in the temperature of the absorbing liquid A2 inside the denitration apparatus 50. Thus the temperature is kept at an appropriate level.

In order to suppress the fine droplets and the like resulting from the absorbing liquid A2 from being entrained in the exhaust gas G to be discharged outside, a mist removing member 56 is arranged above the spray nozzle 51. The exhaust gas G passing through the filling material 54 to rise up passes through the mist removing member 56, and subsequently discharged through a pipe 57 from the denitration apparatus 50. In the same manner as the mist removing member 16 of the desulfurizer 10, the mist removing member 56 may comprise a horizontal layer of a plurality of oblique plates arranged in parallel to each other to have gaps between them. However, the mist removing member 56 may be in any other form, and it may be configured, using, for example, a net-like member or a porous thin plate. As the denitration processing advances, the absorbent in the absorbing liquid A2 is consumed. Therefore, a tank 58 accommodating an aqueous solution in which an absorbent is contained in a high concentration is additionally provided. The absorbent in the tank 58 is appropriately replenished through a circulating path 52 to the denitration apparatus 50. The pH of the absorbing liquid A2 inside the denitration apparatus 40 is monitored by an analyzer S6 in the bottom part thereof.

In regard to the first to third coolers 43 to 45, a cooler having no drain function is also usable. In this case, however, condensed water is introduced to the denitration apparatus 50 together with the pressurized exhaust gas G, so that the absorbent in the absorbing liquid A2 is consumed by acid components dissolved in the condensed water.

The processing system 1 of the present disclosure has, in subsequent stages from the denitration unit 3, a drying unit 5 which removes water content from the exhaust gas, and a mercury removing unit 6 which removes mercury from the exhaust gas. Before the exhaust gas G discharged from the denitration apparatus 50 through the pipe 57 is supplied into the carbon dioxide recovery unit 4, water content and mercury are removed from it. An analyzer S7 is provided on the pipe 57 to measure the nitrogen oxide concentration in the exhaust gas.

The drying unit 5 is configured using a desiccant D which adsorbs moisture. The desiccant D is used in the state of being charged into a pair of columns 61a and 61b so as to repeat drying of the exhaust gas G and regeneration of the desiccant D alternately. Specifically, a terminal of the pipe 57 is branched to be connected to each of the columns 61a and 61b, and a three-way switching valve 62a which controls the supply of the exhaust gas G to the columns 61a and 61b is fitted thereto. Exhaust gas G dried in the columns 61a and 61b is supplied through a pipe 63 and a three-way switching valve 62b into the mercury removing unit 6. Furthermore, a terminal of a pipe 65 through which post-recovery gas G' discharged from the carbon dioxide recovery unit 4 is recirculated is branched to be connected to each of the columns 61a and 61b, and a three-way switching valve 64a which controls the gas supply to the columns 61a and 61b is fitted thereto. A pipe 66 and a three-way switching valve 64b are provided for discharging the post-recovery gas G' supplied to the columns 61a and 61b. By controlling the connection/switching of the three-way switching valves 62a, 62b, 64a and 64b, it is possible to supply the exhaust gas G to only one of the columns 61a and 61b while supplying the post-recovery gas G' to the other. Specifically, if the three-way switching valves 62a and 62b are communicated to the column 61a and the three-way switching valves 64a and 64b are communicated to the column 61b, the exhaust gas G is supplied through the pipe 57 to the column 61a while the post-recovery gas G' recirculated from the carbon dioxide recovery unit 4 is supplied through the pipe 65 to the column 61b. And, if the three-way switching valves are communicated respectively with the opposite to the above-mentioned one, the respective supplies of the gases are reversed. The desiccant D can be suitably used by appropriately selecting one from the materials used generally as a drying agent, and examples thereof include a molecular sieve, silica gel and the like.

The mercury removing unit 6 can be configured by filling a column with a material capable of adsorbing the mercury as an adsorbent, and examples of the adsorbent include activated carbon and the like. Dried exhaust gas G discharged from the columns 61a and 61b is supplied through a pipe 63 to the mercury removing unit 6 to pass through the adsorbent, so that mercury is adsorbed and removed from the exhaust gas G.

The exhaust gas G that has passed through the desulfurization unit 2, the denitration unit 3, the drying unit 5 and the mercury removing unit 6, from which sulfur oxides, nitrogen oxides, water content and mercury have been removed, contains carbon dioxide in a high concentration, and the components contained therein as impurities are substantially oxygen, nitrogen and argon. This exhaust gas G is supplied to the carbon dioxide recovery unit 4 which has a heat exchanger for cooling a gas and a low-temperature distillation tower. Carbon dioxide can be liquefied when it is compressed at a pressure higher than or equal to the boiling line in the temperature range from the triple point to the critical point. Since the exhaust gas G to be supplied to the carbon dioxide recovery unit 4 has been pressurized, in the denitration unit 3, to a pressure at which liquefaction of carbon dioxide is possible, the carbon dioxide in exhaust gas G is liquefied when it is cooled to the boiling line temperature or lower in the heat exchanger of the carbon dioxide recovery unit 4. Since the liquefied carbon dioxide contains the impurities such as oxygen, etc., it is distilled at a distillation temperature of about −30° C. in the low-temperature distillation tower, and the impurities such as oxygen are discharged in the form of gas from the liquefied carbon dioxide. Accordingly, the post-recovery gas G' discharged through the pipe 65 from the carbon dioxide recovery unit 4 is a carbon dioxide gas having a higher proportion of oxygen and the other impurities than the exhaust gas G to be supplied to the carbon dioxide recovery unit 4. This post-recovery gas G' is recirculated to the columns 61*a* and 61*b*, and then used as a regenerating gas for drying the desiccant D. Purified liquefied carbon dioxide C is recovered from the carbon dioxide recovery unit 4.

The post-recovery gas G' discharged from the pipe 65 is heated to about 100° C. or higher through a heating device 67 in order to regenerate the desiccant D. The carbon dioxide recovery unit 4 makes use of a heat pump (refrigeration cycle) apparatus in order to supply a coolant for cooling to the heat exchanger. Since this heat pump apparatus emits exhaust heat and it can be used as a heat source for heating, such a configuration can be made that the exhaust heat is used in the heating device 67 to heat the post-recovery gas G' discharged from the pipe 65. The post-recovery gas G' heated for regeneration is recirculated to the columns 61*a* and 61*b* of the drying unit 5 through the pipe 65, and it is then supplied to the column of the side that no exhaust gas G is supplied, by controlling, the three-way switching valves 62*a*, 62*b*, 64*a* and 64*b* as described above, so that the post-recovery gas G' heats the desiccant D and then water content is emitted from the desiccant D. In this way, post-recovery gas G' containing water vapor is discharged from the columns 61*a* and 61*b*. Since the desiccant D is heated on the regeneration, it is desired to cool the regenerated desiccant D before it is used for drying. For this purpose, it is advisable to stop the heating of the post-recovery gas G' by the exhaust heat when the regeneration of desiccant D is completed, supply unheated post-recovery gas G' to the desiccant D to cool it, and subsequently switch the three-way switching valves so as to alternate the column used for drying the exhaust gas G, of the columns.

In the present disclosure, the branch pipe 72 which is branched from the pipe 66 and connected to the desulfurizer 10 is provided as an oxygen supply unit that supplies a fraction of the post-recovery gas G' discharged from the carbon dioxide recovery unit 4, as an oxygen source, to the desulfurization unit 2, as described above. The proportion of the post-recovery gas G' fraction supplied to the desulfurization unit 2 in the post-recovery gas G' discharged from the carbon dioxide recovery unit 4 is adjusted by flow rate adjusting valves 73 and 74. In order to make this adjustment based on the purity and the recovery ratio of liquefied carbon dioxide C, a CPU or the like is used to provide a monitor 79 that monitors the purity and the recovery ratio of the liquefied carbon dioxide C recovered by the carbon dioxide recovery unit 4 with use of an analyzer 75 which can measure carbon dioxide. The monitor 79 is electrically connected to the flow rate adjusting valves 73 and 74. Since the post-recovery gas G' is carbon dioxide containing nitrogen and argon as impurities, if the proportion of the fraction supplied to the desulfurizer 10 is excessive, the amount of these impurities contained in exhaust gas G becomes high so that the purity of liquefied carbon dioxide C is likely to decrease. Moreover, when the recovery ratio of liquefied carbon dioxide C is low, it is possible to increase carbon dioxide in exhaust gas G by increasing the distribution ratio of the post-recovery gas G' fraction to be supplied to the desulfurizer 10, so as to raise the recovery ratio of liquefied carbon dioxide C. Accordingly, on the basis of signal data sent from the analyzer 75, the monitor 79 controls the flow rate adjusting valves 73 and 74 so as to decrease the distribution ratio of the fraction of post-recovery gas G' to be supplied to the desulfurizer 10 when the purity of the recovered carbon dioxide is lower than a target purity, and so as to increase the distribution ratio of the fraction of post-recovery gas G' to be supplied to the desulfurizer 10 when the recovery ratio of recovered carbon dioxide is lower than a target recovery ratio. Furthermore, the monitor 79 is possible to monitor the sulfur dioxide concentration in the exhaust gas G discharged from the desulfurization unit 2 by means of the analyzer 76 which can measure sulfur dioxide. Thus the distribution ratio of the fraction of post-recovery gas G' to be recirculated to the desulfurizer 10 is raised when the sulfur dioxide concentration in the exhaust gas G discharged from the desulfurization unit 2 is higher than a target sulfur dioxide concentration. As a result, the carbon dioxide concentration in the exhaust gas G turns relatively high while the sulfur dioxide concentration therein turns relatively low.

In the construction of the above-mentioned processing system 1, the washing apparatus 20 can capture solid particles scattered from the desulfurizer 10 according to the limestone/gypsum method without increasing the flow resistance of the exhaust gas introduced from the combustion system, so that it is possible to favorably prevent wear, damage or the like in the subsequent first compressor 41. Thus, this structure is suitable for improving the system in durability. Moreover, the first and second compressors 41 and 42 allow the use of a wet-type denitration processing by advancing the oxidation reaction, so that it becomes unnecessary to use a reduction-type denitration processing in which ammonia or a catalyst, etc. is used. Additionally, the compressors not only function as the reactor 40 for causing the oxidation reaction to advance, but also act as a device for applying a pressure necessary for liquefying carbon dioxide. In short, the pressure necessary for liquefying carbon dioxide is used for constituting the denitration processing. A desulfurization processing according to the limestone/gypsum method and a wet-type denitration processing are an advantageous choice in terms of processing costs and the like. Accordingly, economically favorable is the processing system of the present disclosure that achieves a combination of these processes by incorporating a reaction making use of a compressor.

Hereinafter, a description will be made about an embodiment of an exhaust gas processing method carried out in the processing system 1.

The processing method of the present disclosure has a desulfurization processing that removes a sulfur oxide from exhaust gas G according to the limestone/gypsum method; a denitration processing that removes a nitrogen oxide from exhaust gas G; a carbon dioxide recovery processing that recovers carbon dioxide from exhaust gas G; and an oxygen supply processing that supplies a fraction of post-recovery gas G' discharged by the carbon dioxide recovery processing, as an oxygen source, to the desulfurization processing. Furthermore, a drying processing and a mercury removal processing are conducted between the denitration processing and the carbon dioxide recovery processing, thereby aluminum-made parts of a heat exchanger used for liquefying carbon dioxide are prevented from being damaged by mercury so that liquefied carbon dioxide with high purity can be efficiently recovered. The desulfurization processing has a desulfurization step of using an absorbing liquid to remove the sulfur oxides from the exhaust gas, and a washing step of removing calcium-containing particles contained in the exhaust gas that has undergone the desulfurization step. The desulfurization step is performed in the desulfurizer 10, and the washing step is performed in the washing apparatus 20.

As absorbing liquid A1, an aqueous dispersion liquid containing an absorbent is prepared and accommodated in the desulfurizer 10. As the absorbent, calcium compounds such as limestone (calcium carbonate), quicklime (calcium oxide), slaked line (calcium hydroxide) and the like are usable, and limestone is appropriately used from the viewpoint of costs. Since the calcium compound is not high in water-solubility, it is preferably pulverized in a powdery form and mixed into water to prepare in the form of dispersion liquid in which fine particles are dispersed, to use as the absorbing liquid A1. The desulfurization step is advanced by driving the pump 13 to spray the absorbing liquid A1 from the spray nozzle 11, and introducing the exhaust gas G from the gas inlet portion 14 to bring them into gas-liquid contact with each other. In viewpoint of the efficiency of the gas-liquid contact, with use of the spray nozzle 11 that has a diameter of about 30 to 120 A, the absorbing liquid A1 is sprayed in the form of droplets having a suitable size. The absorbing liquid A1 sprayed from the spray nozzle 11 is cooled through the cooler 15 on the circulating path 12 to be prevented from being raised in liquid temperature. In order to gain a retention period during which the sulfur oxides in exhaust gas G are sufficiently absorbed into absorbing liquid A, the introducing speed of the exhaust gas G is appropriately adjusted in accordance with the sulfur oxide concentration in the exhaust gas G. The sulfur oxides contained in the exhaust gas G are absorbed into the absorbing liquid A1 to produce calcium salts. Sulfur dioxide is dissolved, as a sulfite ion, in absorbing liquid A1 and sulfur trioxide forms calcium sulfate (gypsum) to precipitate, so that the disperse phase in absorbing liquid A1 contain limestone and gypsum. Hydrogen chloride and other acidic halides contained in exhaust gas G are also absorbed and dissolved in the absorbing liquid A1. Soot and dust are also captured therein.

The temperature of exhaust gas G supplied from combustion system generally becomes from about 100 to 200° C. When the exhaust gas G is introduced, the temperature thereof after gas-liquid contact in the desulfurizer 10 becomes from about 50 to 100° C. For this reason, water content in the droplets of absorbing liquid A1 is vaporized, and solid components contained in the absorbing liquid turn into particles (mist) and scattered, so that the particles are entrained in the exhaust gas G. While passing through the mist removing member 16, the solid particles collide easily with the oblique plates. Consequently, the particles are removable to some extent, and further, the particles are sufficiently removable in the subsequent washing apparatus 20. Therefore, in the processing system in FIG. 1, the introduction temperature of the exhaust gas G is allowed to be up to about 200° C.

In the absorbing liquid A1 that has absorbed the sulfur oxides from the exhaust gas G in the desulfurizer 10, calcium sulfite generated from sulfur dioxide is dissolved, but at least a part of it is oxidized by oxygen contained in the post-recovery gas G' supplied from the branch pipe 72, to be deposited as calcium sulfate. Since the post-recovery gas G' contains, as a main component, carbon dioxide and is far smaller in nitrogen proportion than air, post-recovery gas G' after oxygen has been consumed is composed mainly of carbon dioxide, and it floats up in absorbing liquid A1 to be contained in the exhaust gas G from which the sulfur oxides have been removed. Absorbing liquid A1 is partially supplied from the circulating path 12 through the branch path 31 to the oxidizing tank 30, and an oxygen-containing gas such as air is supplied in this stage. In this way, sulfurous acid in the absorbing liquid A1 is oxidized to sulfuric acid and precipitated as gypsum (calcium sulfate) from the absorbing liquid A1. Therefore, if the supply of oxygen from the post-recovery gas G' is insufficient in the desulfurizer 10, sufficient oxidization is performed in the oxidizing tank 30 so that the sulfur oxides in the exhaust gas G precipitate finally as gypsum from the absorbing liquid A1. It is sufficient for the gas to be supplied to the oxidizing tank 30 to be air or a like gas capable of supplying oxygen, and it is supplied in a quantity capable of oxidizing sulfurous acid sufficiently. The absorbing liquid A1 that has been oxidized inside the oxidizing tank 30 is recirculated to the bottom part of the desulfurizer 10 by driving the pump 35. The stirring speed of the stirrer 34 is adjusted to cause the oxidation reaction to advance uniformly in the absorbing liquid. If oxygen is short in the oxidizing tank 30, the opening degree of the on-off valve 32 is restricted, based on the signal data from the analyzer S2, to make an adjustment so that the flow rate of absorbing liquid A1 to be supplied to the oxidizing tank is appropriate for the air quantity (oxygen quantity). Since the absorbent is consumed in accordance with the advance of the desulfurization processing, aqueous slurry in which the absorbent is dispersed in a high content is appropriately supplied from the tank 37 to the desulfurizer 10 to replenish the absorbent, and it is mixed uniformly by the stirrer 19. It is advisable to adjust the concentration in the aqueous slurry to be supplied from the tank 37, considering the water content in the gypsum recovered from the desulfurizer 10. The gypsum precipitated from the absorbing liquid A1 is separated and recovered in the gypsum separator 38. It is advisable that the liquid from which the gypsum has been removed is reused in the desulfurizer 10, or is supplied as water for dissolving limestone, or it is supplied as washing water to the washing nozzle 17.

In the case of making a modification to attain the sedimentation and separation of gypsum in the oxidizing tank 30, it is possible to make suitable the sedimentation and separation of the gypsum by stopping the stirring in the oxidizing tank 30 as required. An intermittent processing may be performed by controlling the on-off valve 32 and the pump 35, so as to sequentially perform a sedimentation/separation step of gypsum, a recirculation step of the supernatant liquid, an emission step of gypsum, and an intake step of the absorbing liquid A1. A supernatant in which the concentration of sulfur-oxide-originating components and calcium has been decreased is suitable for use as washing water for the mist removing member 16, and such a modification to supply it to the washing nozzle 17 is allowable. By the washing of the mist removing member, particles of limestone and the gypsum absorb water to fall down, which drop into the bottom part of the desulfurizer 10. During the dropping, the sulfur oxides can be absorbed from exhaust gas G, and the washing may be therefore performed concurrently with the spray of the absorbing liquid A1.

Exhaust gas G that has undergone the desulfurization step to be discharged from the desulfurizer 10 is supplied through the pipe 18 to the washing apparatus 20, and a washing step is carried out to wash the exhaust gas G with washing water W. In this way, the scattered particles which cannot be removed by the mist removing member 16 are sufficiently removed from the exhaust gas G. At this time, soot and dust, and hydrogen chloride contained in the exhaust gas G are also washed and removed. The exhaust gas G is cooled to the temperature of about 40 to 80° C., and the temperature of exhaust gas G after introduced into the washing apparatus 20 is lowered to about 40 to 80° C.

In the washing step, washing water W is sprayed from the spray nozzle 21 by driving the pump 23, and, by introducing the exhaust gas G from the bottom part of the washing apparatus 20, the exhaust gas G and the washing water W contact each other in the gaps in the filling material 24, so that the scattered particles contained in the exhaust gas G are captured and washed into the washing water W. As the washing water W, water is suitably used. If an aqueous solution of a highly water-soluble alkali agent is used as the washing water W, performance of capturing the scattered particles (calcium compound) is improved and the effects of desulfurization and denitration are also exhibited. Examples of the alkali agent include alkali metal hydroxides such as sodium hydroxide, potassium hydroxide and the like. The washing water W is preferably adjusted to a basic of about pH 7 to 9. In order to prevent fine droplets of washing water W from being entrained in the exhaust gas G, it is preferred to keep the temperature of washing water W in the range of about 40 to 80° C. In accordance with the progress of the washing processing, the calcium compound is incorporated into the washing water W and acidic substances are absorbed into the washing water W so that the washing water W is lowered in pH value. If the washing water W shows acidity, a washing liquid for replenishment is supplied from the tank 28. If the contamination or acidification of washing water W advances, the washing water is discharged from a drain and washing water W inside the tank 28 is replenished.

The exhaust gas G that has undergone the washing step to be discharged from the washing apparatus 20 is subjected to a reaction step, a cooling step and a denitration step for a denitration processing. Initially, in the reaction step, the exhaust gas G is supplied to the first compressor 41 of the denitration unit 3 and then compressed at about 1.0 to 2.0 MPa. By the compression heat, the temperature is raised to about 100 to 200° C., generally about 150° C. By the pressure increase, an oxidation reaction advances in exhaust gas G, so that nitrogen dioxide is produced from nitrogen monoxide and the oxygen content is decreased. Although sulfur oxides of the exhaust gas are substantially removed in the desulfurization unit 2, the oxidation reaction advances also in the remaining sulfur dioxides so that sulfur trioxide is produced from sulfur dioxide. Moreover, mercury is also oxidized to $Hg^{2+}$ to become easily dissolved in water. In the cooling step, the exhaust gas G compressed in the first compressor 41 is supplied to the first cooler 43 to be cooled to a temperature of about 40° C. or lower, so that water vapor contained in the exhaust gas G is condensed. When the cooling is of a water-cooling type, the exhaust gas G is generally cooled to about 40° C. As a result, nitrogen dioxide, the sulfur oxides and mercury each contained in the exhaust gas G are dissolved in the condensed water, so that the amount of them contained in the exhaust gas is decreased. The condensed water is separated from the exhaust gas G and discharged through a drain. Furthermore, the exhaust gas G is supplied to the second compressor 42, so that the reaction step is repeated. At this time, it is compressed at a pressure at which liquefaction of the carbon dioxide is possible. Specifically, the exhaust gas G is compressed to about 2.0 to 4.0 MPa, and the temperature is again raised to about 100 to 200° C. By the pressure increase, an oxidation reaction again advances, so that nitrogen dioxide is produced from the remaining nitrogen monoxide and the oxygen content is further decreased. Also in the remaining sulfur oxides, an oxidation reaction advances so that sulfur trioxide is produced from sulfur dioxide. The oxidation of mercury also advances in the same way. The exhaust gas G compressed in the second compressor 42 is again cooled in the second cooler 44, in a cooling step, to a temperature of about 40° C. or lower, so that water vapor contained in the exhaust gas G is condensed. When the cooling is of a water-cooling type, the exhaust gas G is generally cooled to about 40° C. Nitrogen dioxide, the sulfur oxides and mercury each contained in the exhaust gas G are dissolved in the condensed water, and the amount of them contained in the exhaust gas is further decreased. The condensed water is separated from the exhaust gas G to be discharged through a drain. The exhaust gas G cooled by the second cooler 44 is further cooled through the third cooler 45 to be adjusted to a temperature of about 0 to 10° C., that is suitable as a processing temperature in the denitration apparatus 50. The condensed water is discharged through the drain in the same way. As a result, the quantity of the impurities (nitrogen dioxide, the sulfur oxides and $Hg^{2+}$) that the condensed water generated in the coolers dissolves is removed from the exhaust gas G.

The exhaust gas G that has passed through the third cooler 45 is supplied to the denitration apparatus 50 so that the denitration step is carried out. Specifically, the exhaust gas G rises in the filling material 54, while it is brought into gas-liquid contact with the absorbing liquid A2 sprayed from the spray nozzle 51 by driving the pump 53, so that nitrogen dioxide contained in the exhaust gas G is absorbed into the absorbing liquid A2 to be dissolved as a nitrate salt. The acidic halides such as hydrogen chloride and the remaining sulfur oxides that are each contained in exhaust gas G are also absorbed into the absorbing liquid A2. As the absorbing liquid A2, a substantially neutral or basic aqueous liquid containing an absorbent for absorbing nitrogen oxide may be used. It is adjusted to a pH of about 5 to 9 to use as the absorbing liquid A2. The absorbent may be an alkali metal compound, and is preferably a strongly basic alkali metal hydroxide such as sodium hydroxide, potassium hydroxide and the like. It is preferred for use to prepare an aqueous solution in which the absorbent is dissolved in water. The cooler 55 prevents the absorbing liquid A2 to be sprayed from rising in temperature. As the denitration processing advances, an absorbent is appropriately supplied from the tank 58 to replenish the consumed absorbent.

Exhaust gas G discharged from the denitration apparatus 50 is subjected to a drying processing in the drying unit 5. Specifically, the exhaust gas G is supplied to one of the columns 61a and 61b, and then water content is removed therefrom by the desiccant D. During this period, in the other column, desiccant D is regenerated by the gas for regeneration that is supplied from the carbon dioxide recovery unit 4. Since the capability of processing the exhaust gas G is possibly set in advance based on the moisture absorption capacity of the desiccant D contained in the column, the three-way switching valves 62a to 62b are switched to change the column to be supplied with the exhaust gas G into the other column, before the supply quantity of the exhaust gas G reaches the maximum amount that is possibly processed. At the same time, the three-way switching valves 64a to 64b are switched also to change the column in which the desiccant D is regenerated into the other column. The switching may be made at intervals of a predetermined processing period. The desiccant D to be used may be appropriately selected from the materials usable ordinarily as a drying agent. Examples of the desiccant D includes materials which are capable of physically or chemically absorbing or adsorbing the moisture, such as a molecular sieve, silica gel, alumina, zeolite and the like. The exhaust gas G is supplied to the columns 61a and 61b at the temperature (about 7° C.) of the inside of the denitration apparatus 50, and this temperature corresponds to a temperature for the drying processing. The regenerating processing of the moisture-absorbed desiccant D is performed desirably at a temperature of 100° C. or higher to remove water therefrom. The post-recovery gas G' for regeneration that is supplied from the carbon dioxide recovery unit 4 is dried carbon dioxide which is high in oxygen, nitrogen and argon concentrations. It is heated to a temperature suitable for the regeneration, preferably to about 100° C. or higher and then supplied to the columns so that water is released from the desiccant D, to regenerate the desiccant D.

The dried exhaust gas G discharged from the column 61a or 61b is supplied to the mercury removing unit 6, and then mercury is adsorbed by an absorbent therein to be removed. Examples of the absorbent in the mercury removing unit 6 include activated carbon, activated carbon carrying potassium iodide, ion exchange resin, etc. Since the sulfur oxides, the nitrogen oxides, water and mercury have been removed from the exhaust gas G discharged from the mercury removing unit 6, the exhaust gas G contains carbon dioxide in a very high concentration, and components contained therein as impurities are substantially oxygen, nitrogen and argon.

The temperature of the exhaust gas G in the denitration unit 3, the drying unit 5 and the mercury removing unit 6 depends substantially on the temperature in the denitration apparatus 50, and the pressure of exhaust gas G depends on the compression degree in the second compressor 42. As described above, in the compression in the second compressor 42, exhaust gas G is pressurized and compressed to a pressure at which liquefaction of carbon dioxide is possible, that is, about 2.0 to 4.0 MPa, and exhaust gas G which this pressure is maintained is supplied to the carbon dioxide recovery unit 4. Accordingly, when this exhaust gas G is cooled to the boiling line temperature or lower, preferably about −20 to −50° C. in the heat exchanger of the carbon dioxide recovery unit 4, carbon dioxide in the exhaust gas G is liquefied. The liquefied carbon dioxide is distilled at a temperature of about −20 to −50° C. in the low-temperature distillation tower so that oxygen, nitrogen, argon and other impurities are removed from the liquefied carbon dioxide. The carbon dioxide gas in which the proportion of these impurities has been increased is discharged from the low-temperature distillation tower. Thus, this gas, post-recovery gas G', is heated to 100° C. or higher, preferably about 100 to 200° C., and subsequently recirculated to the desiccant D in the columns 61a and 61b through the pipe 65, so as to be used as a gas for regeneration. For the heating of the gas for regeneration, it is possible to use the exhaust heat from the heat pump (refrigeration cycle) apparatus for supplying the coolant to the heat exchanger of the carbon dioxide recovery unit 4. By regenerating the desiccant D by heat, the post-recovery gas G' which contains water vapor is discharged from the columns 61a and 61b. The purified liquefied carbon dioxide C is recovered from the carbon dioxide recovery unit 4 generally with a purity of about 95 to 99%.

Post-recovery gas G' discharged from the carbon dioxide recovery unit 4, which is carbon dioxide containing approximately several tens of percent of impurities (oxygen, nitrogen and argon), is used for regenerating the desiccant D in the drying unit 5, and its fraction is subsequently supplied as an oxygen source from the branch pipe 72 to the desulfurizer 10. The proportion of the fraction of post-recovery gas G' to be supplied to the desulfurization unit 2 is adjusted through the flow rate adjusting valves 73 and 74. For the adjustment, a target recovery ratio and a target purity of liquefied carbon dioxide C are set in the monitor 79, in advance, and the recovery ratio and the purity of the liquefied carbon dioxide C which are monitored by the analyzer 75 are compared with the target recovery ratio and the target purity, respectively. Then the flow rate adjusting valves 73 and 74 are controlled in such a manner that, if the purity of the recovered carbon dioxide is lower than the target purity, the proportion of the fraction of post-recovery gas G' to be supplied to the desulfurizer 10 is decreased, and that, if the recovery ratio of the recovered carbon dioxide is lower than the target recovery ratio, the proportion of the fraction of post-recovery gas G' to be supplied to the desulfurizer 10 is increased. If both of the purity and the recovery ratio of the recovered carbon dioxide are lower than the respective target values, the setting of the target values is inappropriate. It is therefore necessary to make a change to lower at least one of the set target values. If the proportion of the fraction of post-recovery gas G' to be supplied to the desulfurizer 10 is increased, carbon dioxide in the exhaust gas G increases so that the recovery ratio of the liquefied carbon dioxide C can be raised. If the proportion of the fraction to be supplied to the desulfurizer 10 is decreased, the content of the impurities (nitrogen and argon) contained in the exhaust gas G decreases so that it becomes easy to increase the purity of the liquefied carbon dioxide C. Here, such a modification is also possible that the proportion of the fraction of post-recovery gas G' to be supplied to the desulfurizer 10 is adjusted, based on only one of the purity and the recovery ratio of liquefied carbon dioxide C.

A specific example of a procedure for determining the proportion X of the fraction of post-recovery gas G' to be supplied to the desulfurization unit 2 will be described below.

Initially, the target purity of liquefied carbon dioxide C is set, and only the flow rate adjusting value 73 is opened so that the proportion X of the fraction of post-recovery gas G' to be supplied to the desulfurization unit 2 is zero, and then an exhaust gas processing is performed while the recovery ratio and the purity of the liquefied carbon dioxide C are monitored. It is checked whether or not the purity of the liquefied carbon dioxide C reaches the target value or more, and, if the purity does not reach the target value, the purifying accuracy of the carbon dioxide recovery unit 4 is adjusted so that the purity increases to the target purity or higher. A value higher than the resultant recovery ratio is set to the target recovery ratio, and the flow rate adjusting value 74 is opened so as to make the variation of the proportion X into ΔX. In this state, the recovery ratio and the purity of the liquefied carbon dioxide C are monitored. As far as the purity is the target purity or higher, the adjustment of the flow rate adjusting valves 73 and 74 can be repeated to increase the proportion X by ΔX per once until the recovery ratio reaches the target recovery ratio, and the increasing of the proportion X is stopped when the purity becomes the target purity or lower. If the purity is lower than the target purity, the proportion X is decreased. In such a manner, at the time of recovering the liquefied carbon dioxide C with the target purity, it is possible to increase the recovery efficiency up to the upper limit.

Moreover, the monitor 79 also monitors, by means of the analyzer 76, the sulfur dioxide concentration in the exhaust gas G discharged from the desulfurization unit 2, and it compares the sulfur dioxide concentration in the exhaust gas G with a target sulfur dioxide concentration. If the sulfur dioxide concentration in the exhaust gas G discharged from the desulfurization unit 2 is higher than the target sulfur dioxide concentration, the proportion X of the fraction of post-recovery gas G' to be recirculated to the desulfurizer 10 is increased, thereby the carbon dioxide concentration in the exhaust gas G increases and the sulfur dioxide concentration therein decreases. This adjustment can be made concurrently with the above-mentioned adjustment based on the purity and the recovery ratio of the liquefied carbon dioxide C. However, by adjusting the proportion X to decrease the sulfur dioxide concentration in the exhaust gas G, the purity of liquefied carbon dioxide C is lowered. Thus, if both of them are not satisfied, processing conditions in the desulfurization unit 2 are reconsidered in order to increase the desulfurization efficiency.

By supplying a fraction of the post-recovery gas G' into the desulfurizer 10 in this way, oxygen is consumed for the processing of the exhaust gas, so that the oxygen concentration in the exhaust gas G to be supplied to the carbon dioxide recovery unit 4 is relatively decreased while the carbon dioxide concentration therein is relatively increased. Therefore, an improvement can be made in the purity and the recovery ratio of the liquefied carbon dioxide C under the condition that the impurity content (nitrogen and argon) is not excessively concentrated in the exhaust gas G.

In the processing system 1, the first cooler 43 may be omitted. However, by the removal of condensed water by performing a cooling every time after compression as illustrated in FIG. 1, the water vapor content in the exhaust gas is reduced and load is decreased in the compressors positioned behind. Although the reactor 40 in the processing system 1 includes the two compressors, the reactor 40 may be configured with a single compressor, or three or more compressors. When the number of compressors constituting the reactor 40 is increased, the compression quantity for raising the exhaust gas pressure to a pressure necessary for liquefying carbon dioxide is dispersed into the individual compressors, so that the load applied to each of the compressors is decreased. Unless the pressure of exhaust gas G that has passed through the reactor 40 rises to the pressure at which liquefaction of carbon dioxide is possible, the configuration is modified to pressurize the exhaust gas G in the carbon dioxide recovery unit 4 or in the preceding stage thereof. For example, a compressor and a cooler are additionally provided in front of the carbon dioxide recovery unit 4.

The exhaust gas processing system 1 illustrated in FIG. 1 is an embodiment configured to manage the introduction of exhaust gas G that is high in temperature. If the temperature of exhaust gas G is as low as a temperature lower than 100° C., a modification can be made to improve the processing efficiency on the basis of the managing capability thereof. Such an embodiment is illustrated in FIG. 2.

Figure 2:
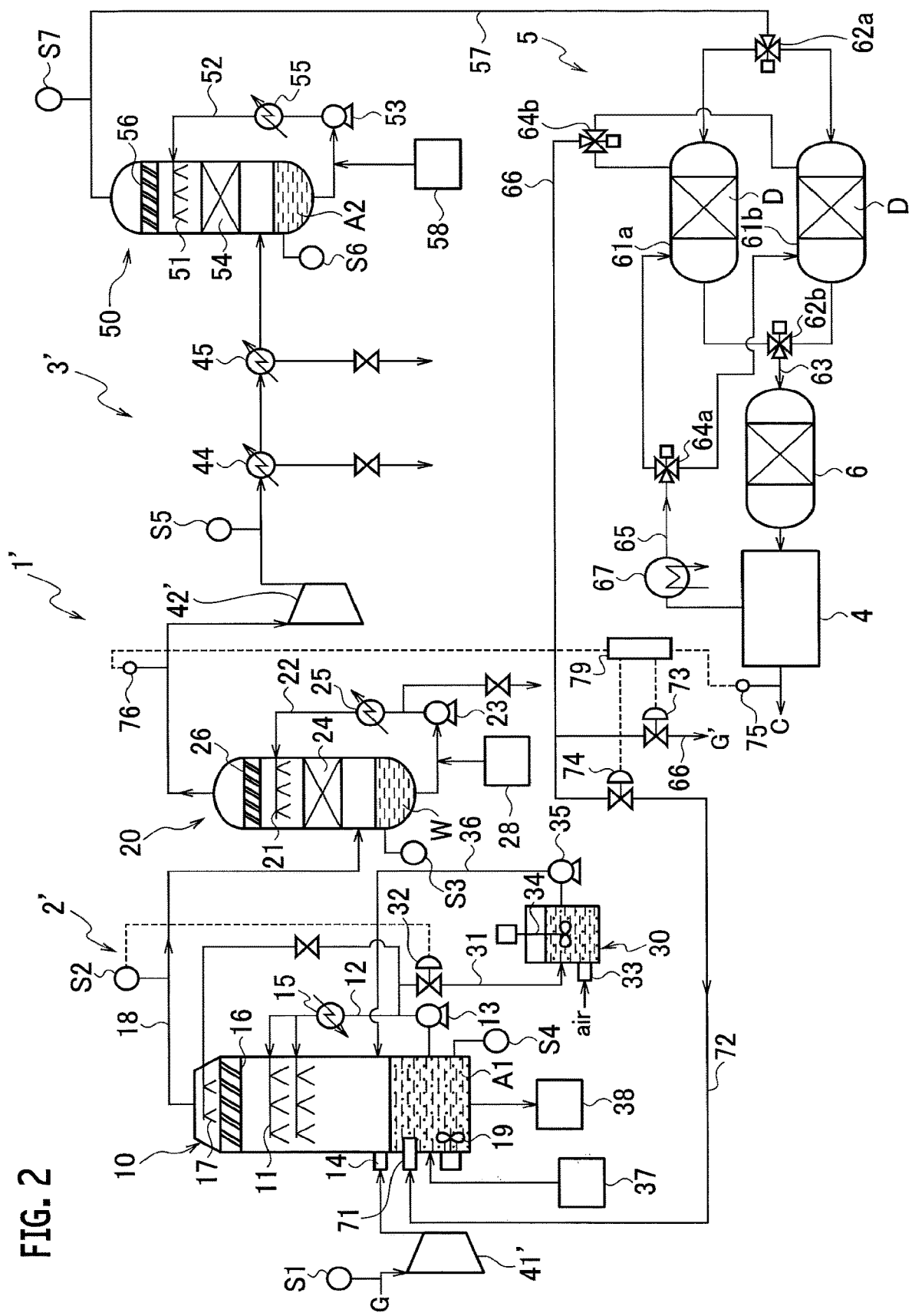
FIG. 2 is a schematic structural view illustrating another embodiment of the exhaust gas processing system according to the disclosure.

Each part of an exhaust gas processing system 1' illustrated in FIG. 2 is configured by using the same components as the processing system 1 of FIG. 1. However, this system is different in that the arrangement of the first compressor 41 is changed and the first cooler 43 is omitted. Specifically, in the processing system 1', the reactor 40 in FIG. 1 is divided into first and second reaction units, and a first compressor 41' constituting the first reaction unit is arranged in front of a desulfurizer 10 in a desulfurization unit 2'. The second reaction unit is made only of a second compressor 42' in a denitration unit 3' located in a subsequent stage from the desulfurization unit 2'. Accordingly, in each of the desulfurization unit 2' and the denitration unit 3', an oxidation reaction is advanced by pressurization in the exhaust gas G that has not yet been processed.

Specifically, when exhaust gas G having a temperature of about 180° C. or lower, which may be lower than 100° C., is supplied to the processing system 1', the exhaust gas G is initially pressurized to about 1.0 to 2.0 MPa in the first compressor 41', so that its temperature is raised into the range of about 100 to 200° C. by the compression heat. By the pressure increase, an oxidation reaction advances in the exhaust gas G to produce sulfur trioxide from sulfur dioxide. Moreover, nitrogen dioxide is produced from nitrogen monoxide, and mercury is also oxidized to $Hg^{2+}$ and becomes easy to be dissolved in water, so that the oxygen content therein is decreased. Since the temperature of the compressed exhaust gas G meets the initial temperature condition of exhaust gas G supplied to the processing system 1 in FIG. 1, a desulfurization processing can be favorably performed by the desulfurizer 10 and a washing apparatus 20. The temperature of exhaust gas G that has been brought into gas-liquid contact with absorbing liquid A1 in the desulfurizer 10 becomes about 40 to 80° C. in the same way as in the case illustrated in FIG. 1. That is, the spray of the absorbing liquid in the desulfurizer 10 also fulfils a role of the first cooler 43 in FIG. 1. Particles scattered from the absorbing liquid A1 are removed to some extent while passing through a mist removing member 16. The remaining particles are entrained in the exhaust gas G discharged from the desulfurizer 10 and sufficiently removed by the washing apparatus 20.

In regard to the components absorbed into absorbing liquid A1 in the desulfurizer 10, sulfur dioxide is decreased while sulfur trioxide is increased, in comparison with those in the embodiment in FIG. 1. Therefore, an initial precipitation amount of gypsum increases while the quantity of oxygen necessary for oxidizing sulfur dioxide in an oxidizing tank 30 decreases. Furthermore, the quantity of nitrogen dioxide and $Hg^{2+}$ absorbed into absorbing liquid A1 also increases. Consequently, the content of nitrogen monoxide and mercury in the exhaust gas G discharged from the washing apparatus 20 of the desulfurization unit 2' becomes smaller than that in the case of FIG. 1.

Exhaust gas G discharged from the washing apparatus 20 is supplied to the second compressor 42'. In the same way as in the second compressor 42 in FIG. 1, the exhaust gas G therein is then compressed to a pressure at which liquefaction of carbon dioxide is possible, and its temperature is raised. By the pressure increase, an oxidation reaction advances again, and nitrogen dioxide is thus produced from the remaining nitrogen monoxide so that the oxygen content is further decreased. Also in regard to the remaining sulfur oxides, an oxidation reaction advances so that sulfur trioxide is produced from sulfur dioxide. The oxidation of mercury also advances. The exhaust gas G compressed in the second compressor 42 is cooled in a second cooler 44 so that water vapor contained in the exhaust gas G is condensed. Nitrogen dioxide, sulfur oxides, and mercury each contained in the exhaust gas G are dissolved in the condensed water so that these contents contained in the exhaust gas G are further decreased. The condensed water is separated from the exhaust gas G to be discharged through a drain.

Thereafter, the exhaust gas G cooled through the second cooler 44 is subjected to cooling through a third cooler 45, a denitration processing in a denitration apparatus 50, a drying processing in a drying unit 5, and mercury adsorption/removal in a mercury removing unit 6. These are the same as in the processing system 1 in FIG. 1. Moreover, the processing system 1' is same as the processing system 1 in FIG. 1 also in regard to a configuration of distributing and supplying to the desulfurizer 10 a fraction of the post-recovery gas G' discharged from the carbon dioxide recovery unit 4, and an operation of controlling the supply. Therefore, description on these configurations and operations is omitted.

When the compressor is arranged in front of the desulfurizer 10 as in the processing system 1' in FIG. 2, the oxygen-consumed quantity in exhaust gas G is increased by the oxidation reaction due to the pressure increase. Accordingly, the oxygen content in the exhaust gas to be supplied to the carbon dioxide recovery unit 4 becomes smaller than that in the case of the processing system 1 in FIG. 1. Moreover, since the components (nitrogen dioxide and $Hg^{2+}$) solubilized in water by oxidation have the increased opportunity to come into contact with the aqueous liquid increases, the processing system 1' is advantageous for an improvement in the removal efficiency of these components, and the use lifespan of the mercury absorbent. In the processing system 1' in FIG. 2, the second reactor of the denitration unit 3' may comprises plural compressors, and this form is equal to an embodiment in which a compressor is added to the front stage of the desulfurizer 10 of the processing system 1 in FIG. 1. If the number of the compressors is increased, it is advisable to set the compression ratio of each of the compressors so as to render the pressure of the exhaust gas G discharged from the final one of the compressors a pressure at which liquefaction of carbon dioxide is possible.

Figure 3:
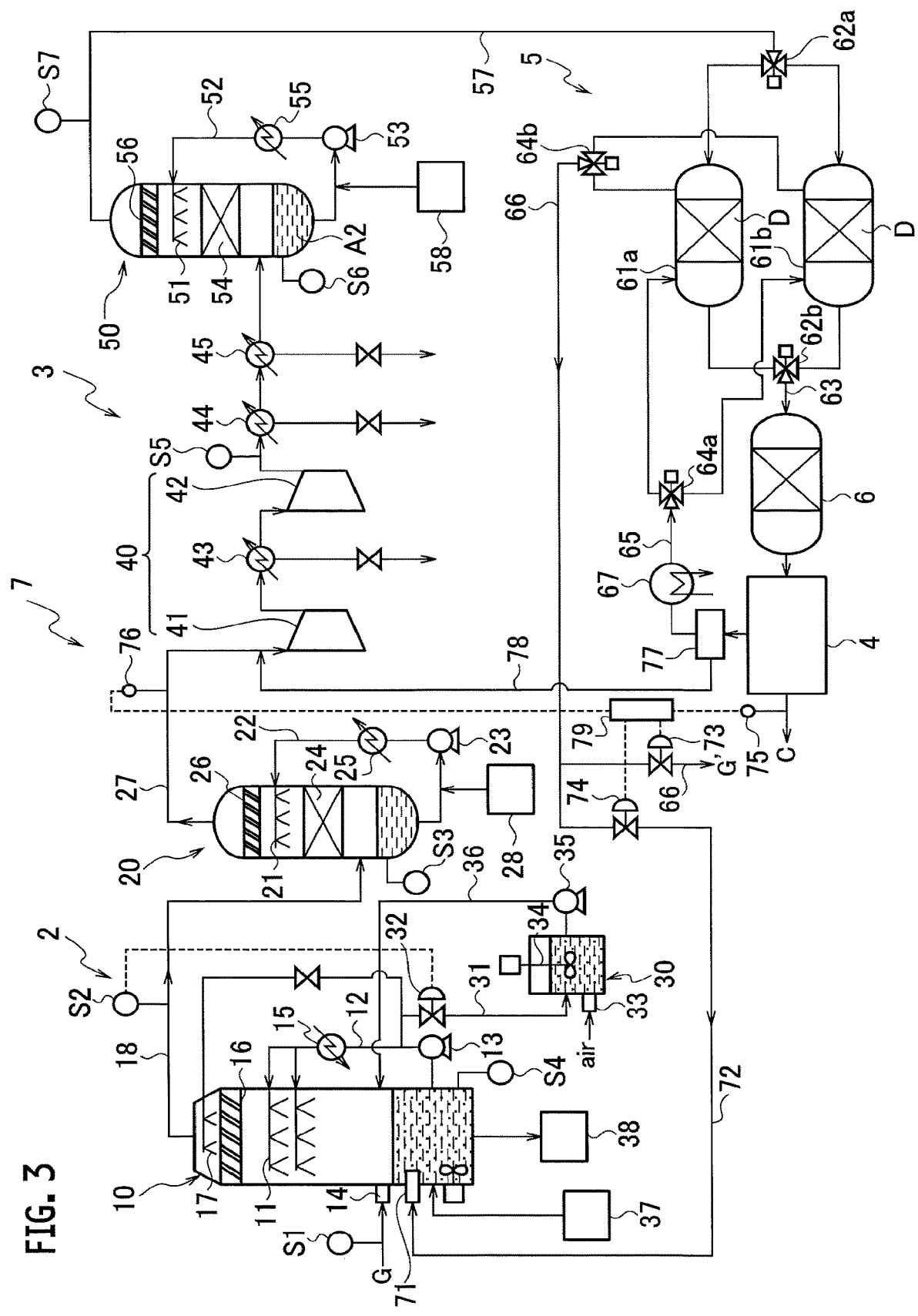
FIG. 3 is a schematic structural view illustrating still another embodiment of the exhaust gas processing system according to the disclosure.

An exhaust gas processing system 7 illustrated in FIG. 3 is configured to further added, to the structure of the processing system 1 in FIG. 1, a separator 77 for separating carbon dioxide from post-recovery gas G', and a pipe 78 as a carbon dioxide supply unit for supplying the separated carbon dioxide to a denitration unit 3. By separating carbon dioxide from post-recovery gas G' which is relatively high in impurity concentration, the impurity concentration (oxygen concentration) in post-recovery gas G' is further increased. The separated carbon dioxide is used to improve the recovery efficiency of liquefied carbon dioxide C in the carbon dioxide recovery unit 4.

Specifically, the separator 77 for separating carbon dioxide is provided on a pipe 65 through which post-recovery gas G' is discharged from the carbon dioxide recovery unit 4. The separator 77 is connected to a pipe 27 through a pipe 78. The post-recovery gas G' discharged from the carbon dioxide recovery unit 4, from which carbon dioxide is separated through the separator 77, is lowered in the carbon dioxide concentration while it is increased in the oxygen concentration relatively. In this state, the post-recovery gas G' is heated by a heating device 67 and then used to regenerate the desiccant D in a drying unit 5, in the same manner as in the processing system 1 in FIG. 1. Subsequently, a fraction of this gas is supplied through a branch pipe 72 to a desulfurizer 10 of a desulfurization unit 2. In the meantime, the carbon dioxide separated from the post-recovery gas G' by the separator 77 is supplied through the pipe 78 to a first compressor 41 of the denitration unit 3 and then added to exhaust gas G. As a result, the carbon dioxide concentration in exhaust gas G is increased in and after the denitration unit 3 of the processing process, and an improvement is made in the purity and the recovery ratio of liquefied carbon dioxide C recovered by the carbon dioxide recovery unit 4.

The separator 77 is an apparatus which separates carbon dioxide according to the absorption method using a chemical absorption or physical absorption, the adsorption method using physical adsorption, or the membrane separation method using a selectively permeable membrane. This apparatus makes use of a material which exhibits absorption, adsorption or permeability selectively to carbon dioxide as an absorbent, an adsorbent or a selectively permeable membrane. In the separation according to the chemical absorption method or the physical absorption method, for example, a basic compound or a dissolving medium, such as monoethanolamine, methyldiethanolamine and the like is used as the absorbent. In the separation according to the physical adsorption such as a TSA method (temperature swing adsorption method), for example, synthetic zeolite such as NaX type zeolite, CaX type zeolite, BaX type zeolite and the like, and activated carbon, etc. are usable as the absorbent. By using the absorbent in the form of a molecular sieve having pores, such as a zeolite molecular sieve or molecular sieving carbon, the separation is favorably performed. In the membrane separation method using a selectively permeable membrane, a separation membrane developed as a molecular sieve membrane, a facilitated transport membrane or a molecular gate film or the like is utilized. For example, such a composite membrane is used that a separating material such as a polyamideamine dendrimer is combined with a polymer such as PEG or PVA. From the viewpoint of energy required for the separation and regeneration operations, etc., a separator utilizing an adsorbent is preferred. In the separation according to the TSA method, it is possible to use, as the adsorption pressure, a high pressure in the carbon dioxide recovery unit 4 which handles the liquefied carbon dioxide.

In the processing system 7 in FIG. 3, others than the above-mentioned points are similar to those in the processing system 1 in FIG. 1. Thus description thereon is omitted.

INDUSTRIAL APPLICABILITY

In the disclosure, carbon dioxide with a high purity can be efficiently recovered in a processing of an exhaust gas discharged from thermal power stations, ironworks, boilers and other facilities, and the processing of the exhaust gas can be used to supply liquefied carbon dioxide. The disclosed technology is used for a processing of a carbon-dioxide-containing gas or others, and it is thus useful for decreasing the amount of discharged carbon dioxide and its impact on the environment, etc. While the durability of an apparatus therefor is ensured, costs for the processing can be decreased. Thus the technology can provide an exhaust gas processing system that can attain a system management without any trouble, and can contribute to environmental protection.

As there are many apparently widely different embodiments of the disclosure that may be made without departing from the spirit and scope thereof, it is to be understood that the disclosure is not limited to the specific embodiments thereof, except as defined in the appended claims.

What is claimed is:
1. An exhaust gas processing system, comprising:
  a desulfurization unit having a gas inlet portion from which an exhaust gas introduced, that removes a sulfur oxide from the exhaust gas by a limestone/gypsum method;
  a denitration unit arranged in a subsequent stage from the desulfurization unit to remove a nitrogen oxide from the exhaust gas;

a drying unit arranged in a subsequent stage from the denitration unit and having a desiccant to remove water from the exhaust gas;

a carbon dioxide recovery unit arranged in a subsequent stage from the drying unit to recover carbon dioxide from the exhaust gas by separating the exhaust gas into carbon dioxide and a post-recovery gas in which carbon dioxide is reduced; and an oxygen supply unit having a pipe through which the post-recovery gas is discharged from the carbon dioxide recovery unit via the drying unit and a branch pipe branched from the pipe and connected to the desulfurization unit, that supplies a fraction of the post-recovery gas discharged from the carbon dioxide recovery unit, as an oxygen source, to the desulfurization unit through the branch pipe, wherein the desiccant of the drying unit is regenerated with the post-recovery gas discharged from the carbon dioxide recovery unit through the pipe, and wherein the oxygen supply unit comprises:

a monitor having an analyzer for monitoring a purity and a recovery ratio of the recovered carbon dioxide recovered by the carbon dioxide recovery unit; and flow rate adjusting valves provided on the pipe and the branch pipe, that adjust a proportion of the fraction of the post-recovery gas to be supplied to the desulfurization unit in the post-recovery gas discharged from the carbon dioxide recovery unit, based on the purity and the recovery ratio of the recovered carbon dioxide which are monitored by the monitor, thereby enabling a supply condition that impurity is not excessively concentrated in the exhaust gas to be supplied to the carbon dioxide recovery unit.

2. The exhaust gas processing system as set forth in claim 1, wherein the monitor compares the purity of the recovered carbon dioxide and the recovery ratio of the carbon dioxide which are monitored by the analyzer, with a target purity and a target recovery ratio, and performs at least one of: an adjustment to decrease the proportion of the fraction of the post-recovery gas to be supplied to the desulfurization unit when the monitored purity of the recovered carbon dioxide is lower than the target purity; and an adjustment to increase the proportion of the fraction of the post-recovery gas to be supplied to the desulfurization unit when the monitored recovery ratio of the recovered carbon dioxide is lower than the target recovery ratio.

3. The exhaust gas processing system as set forth in claim 2, wherein the monitor further comprises an additional analyzer for monitoring a concentration of sulfur dioxide in the exhaust gas discharged from the desulfurization unit, and the monitor compares the sulfur dioxide concentration in the exhaust gas which is monitored by the additional analyzer, with a target sulfur dioxide concentration, and performs an adjustment to increase the proportion of the fraction of the post-recovery gas to be supplied to the desulfurization unit when the monitored sulfur dioxide concentration in the exhaust gas is higher than the target sulfur dioxide concentration.

4. The exhaust gas processing system as set forth in claim 1, wherein the oxygen supply unit comprises: a separator for separating carbon dioxide from the post-recovery gas discharged from the carbon dioxide recovery unit; and a carbon dioxide supply unit that supplies the carbon dioxide separated by the separator to the denitration unit, and the oxygen supply unit supplies the post-recovery gas from which the carbon dioxide has been separated by the separator partially to the desulfurization unit.

5. The exhaust gas processing system as set forth in claim 1, wherein the desulfurization unit comprises: a desulfurizer that uses an absorbing liquid containing a calcium compound to remove the sulfur oxide from the exhaust gas; and a washing apparatus that uses a washing water to wash the exhaust gas discharged from the desulfurizer and remove calcium-containing particles contained in the exhaust gas, and the oxygen supply unit supplies the fraction of the post-recovery gas to the absorbing liquid in the desulfurizer.

6. The exhaust gas processing system as set forth in claim 5, wherein the desulfurization unit further comprises a first reactor arranged in front of the desulfurizer, which advances an oxidation reaction to produce sulfur trioxide from sulfur dioxide, and the denitration unit comprises: a second reactor arranged in a subsequent stage from the desulfurization unit, which advances an oxidation reaction to produce nitrogen dioxide from nitrogen monoxide; and a denitration apparatus that uses an aqueous absorbing liquid to remove nitrogen dioxide from the exhaust gas.

7. The exhaust gas processing system as set forth in claim 1, wherein the denitration unit comprises a reactor that advances an oxidation reaction to produce nitrogen dioxide from nitrogen monoxide, and a denitration apparatus that uses an aqueous absorbing liquid to remove nitrogen dioxide from the exhaust gas, and the reactor comprises at least one compressor for compressing the exhaust gas discharged from the desulfurization unit, and the denitration unit further comprises at least one cooler for cooling the exhaust gas compressed by the at least one compressor.

8. The exhaust gas processing system as set forth in claim 1, further comprising: a mercury removing unit that removes mercury from the exhaust gas.

9. An exhaust gas processing method, comprising:
providing the apparatus of claim 1;
a desulfurization processing that the exhaust gas is introduced to remove the sulfur oxide from the exhaust gas according to the limestone/gypsum method;
a denitration processing that removes the nitrogen oxide from the exhaust gas;
a drying processing to remove water from the exhaust gas with the desiccant;
a carbon dioxide recovery processing that recovers carbon dioxide from the exhaust gas by separating the exhaust gas into carbon dioxide and the post-recovery gas in which carbon dioxide is reduced;
a regenerating processing to supply the post-recovery gas discharged by the carbon dioxide recovery processing, to the desiccant used in the drying processing, to regenerate the desiccant; and
an oxygen supply processing that supplies the fraction of the post-recovery gas discharged by the carbon dioxide recovery processing, as the oxygen source, to the desulfurization processing,
wherein the oxygen supply processing comprises:
monitoring of the purity and the recovery ratio of the recovered carbon dioxide recovered by the carbon dioxide recovery processing; and
adjustment for adjusting the proportion of the fraction of the post-recovery gas to be supplied to the desulfurization processing in the post-recovery gas discharged from the carbon dioxide recovery processing, based on the purity and the recovery ratio of the recovered carbon dioxide which are monitored by the monitoring, thereby enabling the supply condition that impurity is not excessively concentrated in the exhaust gas to be supplied to the carbon dioxide recovery processing.

* * * * *